United States Patent
Tengler et al.

(10) Patent No.: US 8,660,735 B2
(45) Date of Patent: Feb. 25, 2014

(54) METHOD OF PROVIDING INFORMATION TO A VEHICLE

(75) Inventors: Steven C. Tengler, Grosse Pointe Park, MI (US); Mark S. Frye, Grosse Pointe Woods, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 13/325,519

(22) Filed: Dec. 14, 2011

(65) Prior Publication Data

US 2013/0158778 A1    Jun. 20, 2013

(51) Int. Cl.
| | |
|---|---|
| *H04H 60/82* | (2008.01) |
| *H04H 60/83* | (2008.01) |
| *H04H 60/84* | (2008.01) |
| *H04H 60/85* | (2008.01) |
| *H04H 60/86* | (2008.01) |
| *H04H 60/87* | (2008.01) |
| *G01C 21/00* | (2006.01) |
| *G01C 21/26* | (2006.01) |
| *G01C 21/30* | (2006.01) |
| *G01C 21/32* | (2006.01) |
| *G01C 21/34* | (2006.01) |
| *G01C 21/36* | (2006.01) |

(52) U.S. Cl.
USPC ........... 701/24; 701/31.5; 701/32.7; 701/468; 701/522; 701/537; 340/988; 340/995.17

(58) Field of Classification Search
CPC ....... H04H 20/62; H04H 60/82; H04H 60/83; H04H 60/84; H04H 60/85; H04H 60/86; H04H 60/87; G01C 21/00; G01C 21/26; G01C 21/30; G01C 21/32; G01C 21/34; G01C 21/36; G01C 21/3614; G01C 21/3623; G01C 21/365

USPC ................. 701/24, 31.5, 32.7, 468, 522, 537; 340/901–905, 988, 995.17, 995.25
See application file for complete search history.

(56) References Cited

U.S. PATENT DOCUMENTS

| | | | |
|---|---|---|---|
| 4,740,780 | A | 4/1988 | Brown et al. |
| 5,231,379 | A | 7/1993 | Wood et al. |

(Continued)

FOREIGN PATENT DOCUMENTS

JP    09229707    9/1997

OTHER PUBLICATIONS

Kemeny, Dr. A., et al., "Perception of size in vehicle for architecture studies", Renault Technical Center for Simulation, Oct. 7, 2008, 3 pgs.

(Continued)

*Primary Examiner* — Mary Cheung
*Assistant Examiner* — Atul Trivedi
(74) *Attorney, Agent, or Firm* — Dierker & Associates, P.C.

(57) ABSTRACT

A method of providing information to a vehicle involves selecting content, and a source from which the information is retrievable. The information pertains to the content and the content is associated with an entity. The vehicle is tracked in real time. Via a telematics unit of the vehicle, vehicle data obtained from the tracking (including at least a then-current vehicle location and speed) is uploaded to an offboard server. The data is utilized, by a processor associated with the offboard server, to identify the entity that is within proximity of the vehicle. Information from the selected content source is obtained via the offboard server. The information is associated with the entity. The information is transmitted to the telematics unit. The information that is displayed to the vehicle is associated with an object representing the entity that is within the field of view of a vehicle occupant.

15 Claims, 11 Drawing Sheets

(56) References Cited

U.S. PATENT DOCUMENTS

| | | | |
|---|---|---|---|
| 5,519,410 | A | 5/1996 | Smalanskas et al. |
| 6,043,937 | A | 3/2000 | Hudson et al. |
| 6,285,317 | B1 | 9/2001 | Ong |
| 2005/0033511 | A1* | 2/2005 | Pechatnikov et al. ......... 701/210 |
| 2006/0079252 | A1 | 4/2006 | Obradovich et al. |
| 2008/0051946 | A1* | 2/2008 | Breed ............................... 701/1 |
| 2008/0120030 | A1* | 5/2008 | Yamada ........................ 701/214 |
| 2009/0005961 | A1* | 1/2009 | Grabowski et al. ........... 701/200 |
| 2009/0187300 | A1* | 7/2009 | Everitt et al. ................... 701/29 |
| 2009/0222203 | A1 | 9/2009 | Mueller |
| 2009/0281716 | A1* | 11/2009 | Jung et al. ..................... 701/200 |
| 2009/0292528 | A1* | 11/2009 | Kameyama ....................... 704/9 |
| 2009/0318168 | A1* | 12/2009 | Khosravy et al. .......... 455/456.3 |
| 2009/0319178 | A1* | 12/2009 | Khosravy et al. ............. 701/207 |
| 2010/0131189 | A1* | 5/2010 | Geelen et al. ................. 701/201 |
| 2010/0205541 | A1* | 8/2010 | Rapaport et al. .............. 715/753 |
| 2010/0253539 | A1* | 10/2010 | Seder et al. .................... 340/903 |
| 2010/0253542 | A1* | 10/2010 | Seder et al. ................. 340/932.2 |
| 2010/0273510 | A1 | 10/2010 | Herman et al. |
| 2011/0273568 | A1* | 11/2011 | Lagassey ....................... 348/159 |

OTHER PUBLICATIONS

Scott-Young, Stephen, "Seeing the Road Ahead", GPS World, Nov. 1, 2003, 4pgs., http://www.gpsworld.com/transportation/road/seeing-road-ahead-837?print=1.

* cited by examiner

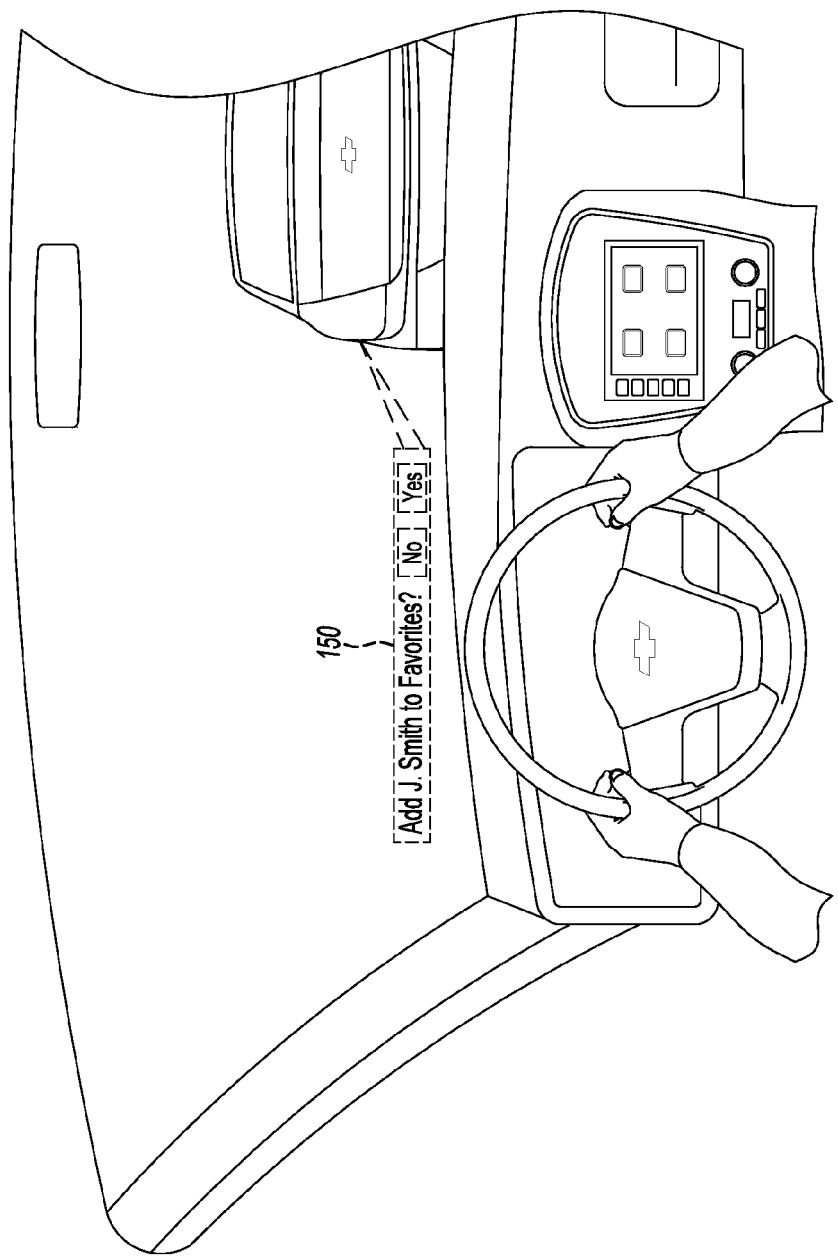

METHOD OF PROVIDING INFORMATION TO A VEHICLE

TECHNICAL FIELD

The present disclosure relates generally to methods of providing information to a vehicle.

BACKGROUND

Vehicle dedicated communications devices (i.e., telematics units) may be used to provide information to a vehicle, such as requested content or services, advertisements, coupons, and/or the like. Such information, which may or may not have been solicited by a vehicle occupant, may be provided to the vehicle, e.g., as audio content through an in-vehicle audio component or as visual content (e.g., text and/or graphics) shown on an in-vehicle display unit.

SUMMARY

A method of providing information to a vehicle is disclosed herein. The method involves selecting content, and a source from which the information is retrievable. The information pertains to the content, and the content is associated with an entity. The method further involves tracking the vehicle in real time via a telematics unit operatively disposed in the vehicle, and via the telematics unit, uploading data obtained from the tracking to an offboard server. The data obtained from the tracking includes at least a then-current location and a then-current speed of the vehicle. Via a processor associated with the offboard server, the data is utilized to identify the entity that is within proximity of the vehicle and, via the offboard server, the information (which is associated with the identified entity) is obtained from the selected content source. The information is transmitted from the offboard server to the telematics unit, and the information is displayed to the vehicle so that the information is associated with an object representing the entity that is within a field of view of a vehicle occupant.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3A depicts a first geographic boundary constructed at time $t_1$ and FIG. 3B depicts a second geographic boundary constructed at time $t_2$;

FIG. 8A semi-schematically depicts an example of a portion of a vehicle interior where information and at least one actionable item associated with the information is displayed to the vehicle occupant according to an example of the present disclosure;

DETAILED DESCRIPTION

Figure 1:
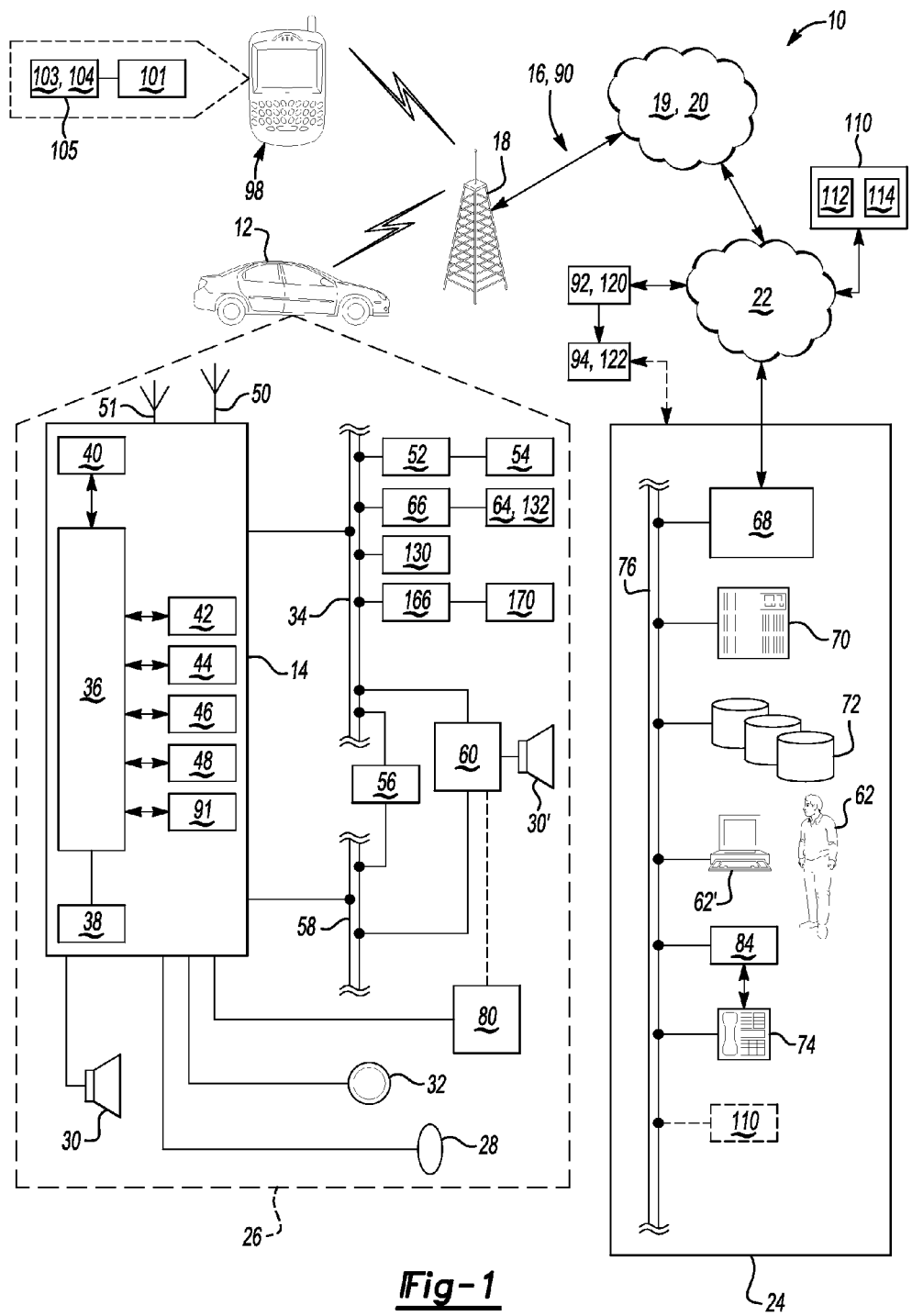
FIG. 1 is a schematic diagram depicting an example of a system for providing information to a vehicle.

Example(s) of the method as disclosed herein may be used to provide information to a vehicle occupant in real time (such as, e.g., while the vehicle is traveling along a roadway). It is believed that, via the method, vehicle occupant(s) may become fully aware of his/her/their immediate surroundings in real time, rather than merely perceiving portions of his/her/their surroundings during his/her/their travels. For instance, a vehicle occupant may be able to receive information pertaining to any entity (e.g., a point of interest, a particular person, a landmark, etc.) when an object representing that entity is within the immediate surroundings of the vehicle while the vehicle is traveling along a roadway. In an example, the immediate surroundings of the vehicle include areas outside of the vehicle that are within the field of view of the vehicle occupant(s) (e.g., the vehicle driver or a vehicle passenger).

The method may utilize augmented reality to display information pertaining to the entity to the vehicle occupant while the vehicle is traveling along a roadway. The information may be visually displayed, for example, as an augmented image (e.g., an overlay) placed over and/or adjacent to (such as, for instance, above, to the left of, to the right of, or below) an object that is within the field of view of the vehicle occupant(s), where such object represents a particular entity. In some cases, the augmented reality may be used to provide the information to the vehicle occupant(s) in an audible form, such as by an audible message that is playable over, e.g., the speaker(s) connected to an in-vehicle audio component.

The examples of the method also utilize a vehicle dedicated communications device (i.e., a telematics unit) that dynamically receives the information pertaining to the entity while the vehicle is traveling. Such information may be received, for example, from an offboard server (which may or may not be part of a telematics service center or call center). Further, the information received by telematics unit may be obtained, by the offboard server, from one or more user-selected content sources, for example, a website, an address book, a publically accessible database, an application resident on a mobile communications device, or combinations thereof. In an example, the user-selected source may be an online networking site, such as Facebook™, TWITTER®, and/or the like.

As used herein, the term "vehicle driver" or "driver" refers to any person that is then-currently operating a mobile vehicle. In one example, the "vehicle driver" may be a vehicle owner or another person who is authorized to drive the owner's vehicle. Further, in instances where the vehicle driver is a telematics service subscriber, the term "vehicle driver" may be used interchangeably with the terms user and/or subscriber/service subscriber.

It is to be understood that the vehicle driver is also a vehicle occupant. In some cases, the vehicle has a single vehicle occupant; i.e., the vehicle driver. In other cases, the vehicle has two or more vehicle occupants; i.e., the vehicle driver and one or more passengers. In these other cases, any of the vehicle occupants (i.e., the vehicle driver and passenger(s)) may be considered to be a user for the examples of the method disclosed herein.

Further, the user (e.g., the vehicle driver or other vehicle occupant) may also be a person who participates in online networking. In some of the examples described herein, the user has his/her own personal webpage upon which content may be posted. The content generally includes information pertaining to an entity (e.g., a user's contact, a point of interest, etc.), and the information may be available for use (e.g., to be provided to the vehicle occupant) in the examples of the method described herein.

It is to be understood that the methods disclosed herein may be utilized and/or applied at any time the electrical system of the vehicle is in an ON state. In other words, the method may be utilized and/or applied when the telematics unit of the vehicle is in an operable state, whether or not the vehicle engine is running.

Furthermore, the term "communication" is to be construed to include all forms of communication, including direct and indirect communication. Indirect communication may include communication between two components with additional component(s) located therebetween.

Still further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

FIG. 1 described in detail below depicts a system 10 for providing information to a vehicle. The system 10 generally includes the mobile vehicle 12, a telematics unit 14 operatively disposed in the mobile vehicle 12, a carrier/communication system 16 (including, but not limited to, one or more cell towers 18, one or more base stations 19 and/or mobile switching centers (MSCs) 20, and one or more service providers (e.g., 90) including mobile network operator(s)), one or more land networks 22, and one or more telematics service/call centers 24. In an example, the carrier/communication system 16 is a two-way radio frequency communication system, and may be configured with a web service supporting system-to-system communications (e.g., communications between the call center 24 and the service provider 90).

The carrier/communication system 16 also includes one or more host servers 92, 120 including suitable computer equipment (not shown) upon which information of a website resides/is stored. As disclosed herein, one of the websites may be a networking site with which a remotely accessible page 94 (e.g., a webpage) is associated, and another of the websites may be a service site and/or account managing site associated with the telematics call center 24 (described below). In an example, the remotely accessible page 94 is a networking page set up and maintained by the user (e.g., the vehicle driver), for example, and the webpage 94 is hosted by a social networking website. While, in this example, the webpage 94 is discussed as being a personal webpage of the user, it is to be understood that the webpage 94 may be run and owned by the entity operating the social networking website and is stored on the host server 92. It is further to be understood that the webpage 94 may be also be run and owned by the user who operates his/her own social networking site, where such site is stored on a user-owned host server.

In an example, the host server 120 includes suitable computer equipment (not shown) upon which information of another remotely accessible page 122 resides/is stored. This remotely accessible page 122 is a webpage set up and maintained by a network provider 90 or by a telematics service provider, and the user may access the page 122 by, e.g., submitting personal information (e.g., a login ID) and authenticating information (e.g., a password, a PIN, etc.). The computer equipment used to log into the page 122 may also include hardware, which, for example, can receive and read a smart card for identification/authentication purposes, or can utilize biometrics for identification/authentication purposes.

The overall architecture, setup and operation, as well as many of the individual components of the system 10 shown in FIG. 1 are generally known in the art. Thus, the following paragraphs provide a brief overview of one example of the system 10. It is to be understood, however, that additional components and/or other systems not shown here could employ the method(s) disclosed herein.

Vehicle 12 may be a mobile vehicle, such as a motorcycle, car, truck, recreational vehicle (RV), boat, plane, or the like, and is equipped with suitable hardware and software that enables it to communicate (e.g., transmit and/or receive voice and data communications) over the carrier/communication system 16.

Some of the vehicle hardware 26 is shown generally in FIG. 1, including the telematics unit 14 and other components that are operatively connected to the telematics unit 14. Examples of other hardware 26 components include a microphone 28, speakers 30, 30', and buttons, knobs, switches, keyboards, and/or controls 32. Generally, these hardware 26 components enable a user to communicate with the telematics unit 14 and any other system 10 components in communication with the telematics unit 14. It is to be understood that the vehicle 12 may also include additional components suitable for use in, or in connection with, the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections, such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard vehicle dedicated communications device. In an example, the telematics unit 14 is linked to a telematics service center (e.g., a call center 24) via the carrier system 16, and is capable of calling and transmitting data to the call center 24.

The telematics unit 14 provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), a dual antenna 50, and a short range wireless antenna 51. In one example, the wireless modem 42 includes a computer program and/or set of software routines (i.e., computer readable instructions embedded on a non-transitory, tangible medium) executed by the processing device 36.

It is to be understood that the telematics unit 14 may be implemented without one or more of the above listed components (e.g., the real time clock 46), except in some examples disclosed herein, the telematics unit 14 includes the short range wireless network 48. It is to be further understood that telematics unit 14 may also include additional components and functionality as desired for a particular end use.

The electronic processing device 36 of the telematics unit 14 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. The electronic processing device 36 (also referred to herein as a processor) may, for example, include software programs having computer readable code to initiate and/or perform various functions of the telematics unit 14, as well as computer readable code for performing various steps of the examples of the method disclosed herein. For instance, the processor 36 may include a software program including computer readable code (embedded on a non-transitory, tangible medium) for tracking the vehicle 12 in real time, and for uploading vehicle data (such as, e.g., a then-current vehicle speed, a then-current vehicle location, etc.) obtained from the tracking to an offboard server 110, which may be part of, or separate from the call center 24. The processor 36 may also include a software program including computer readable code (embedded on a non-transitory, tangible medium) for processing instructions for how information is to be displayed, restrictions on the amount of information to be displayed, any actionable items to be displayed along with the displayed information, and/or the like.

In some cases, the telematics unit 14 may obtain vehicle data from various in-vehicle systems, and may send the vehicle data to the offboard server 110. The transmission of the vehicle data from the telematics unit 14 to the offboard server 110 may occur during a vehicle data upload (VDU) event, which may be initiated in response to a trigger. The trigger may, e.g., be a temporal trigger, where a VDU event is initiated every 5 seconds, every 10 seconds, every 30 seconds, every minute, etc. while the electrical system (including telematics unit 14) of the vehicle 12 is in operation. The trigger may, in another example, be a vehicle position trigger, where a VDU event is initiated upon detecting that the vehicle 12 has traveled a certain distance, such as 1 mile, 5 miles, 10 miles, etc. In further examples, the trigger may be generated external to the vehicle 12, such as by an event occurring outside of the vehicle 12 (e.g., upon detecting, via motion sensors, the movement of an entity outside of the vehicle 12) or by a message posted on the user's networking page 94. The trigger may also be based on the relative positioning of the vehicle 12, e.g., the positioning of the vehicle 12 with respect to a reference position, such as a particular point of interest or another vehicle. If, e.g., the reference position is the garage address of the vehicle 12, the relative position trigger may be set to activate when the vehicle 12 is a certain distance from the reference position. It is to be understood that multiple reference points may be used so that multiple triggers can occur (e.g., one reference point that is about 10 miles from home, another reference point that is about 50 miles from home, yet another reference point that is about 100 miles from home, and so on). It is further to be understood that multiple triggers may be implemented simultaneously, for example, the initial trigger may be when the vehicle 12 is 20 miles from his/her garage address, and then additional triggers may be every 10 miles after the initial 20 miles.

The VDU event may occur, for instance, during a packet data session, where data in the form of packet data is transmitted over a packet-switch network (e.g., voice over Internet Protocol (VoIP), communication system 16, etc.). The telematics unit 14 includes a vehicle data upload (VDU) system 91 or is interfaced to the VDU system 91. As used herein, the VDU system 91 is configured to receive the vehicle data from various vehicle 12 systems and/or from the memory 38 (in instances where the vehicle data is stored in the memory for later transmission of such data to, e.g., the offboard server 110). The VDU system 91 then packetizes the data and places the data into a suitable format for uniform transmission to the offboard server 110, and transmits the packetized data message to the offboard server 110. In some cases, the vehicle data may already be packetized (e.g., the data may be stored in the memory 38 as packetized data), and in such instances, the VDU 91 will simply revise the format for uniform transmission of the data to the offboard server 110. Revising the format may include, for example, re-packetizing the data for transmission over the wireless communication system 16 (which may require a different format than the format of the data stored in the memory 38). In one example, the VDU 91 is operatively connected to the processor 36 of the telematics unit 14, and thus is in communication at least with the offboard server 110 via the communication system 16. In another example, the VDU 91 may be the telematics unit's central data system that can include its own modem, processor, and onboard database. The database can be implemented using a separate network attached storage (NAS) device or be located elsewhere, such as in the memory 38, as desired. The VDU 91 has an application program that handles the vehicle data upload processing, including communication with the offboard server 110.

Still referring to FIG. 1, the location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. Basically, the cellular chipset 40 is a semiconductor engine that enables the telematics unit 14 to connect with other devices (e.g., other mobile communications devices) using some suitable type of wireless technology. The cellular chipset-component 40 uses one or more prescribed frequencies in the 800 MHz analog band or in the 800 MHz, 900 MHz, 1900 MHz and higher digital cellular bands. In some cases, the cellular chipset/component 40 may also use a frequency below 800 MHz, such as 700 MHz or lower. In yet other cases, the cellular chipset/component 40 may use a frequency above 2600 MHz. Any suitable protocol may be used, including digital transmission technologies, such as TDMA (time division multiple access), CDMA (code division multiple access), GSM (global system for mobile telecommunications), and LTE (long term evolution). In some instances, the protocol may be short range wireless communication technologies, such as BLUETOOTH®, dedicated short range communications (DSRC), or Wi-Fi™. In other instances, the protocol is Evolution Data Optimized (EVDO) Rev B (3G) or Long Term Evolution (LTE) (4G). In an example, the cellular chipset/component 40 may be used in addition to other components of the telematics unit 14 to establish communications between the vehicle 12 and another party.

Also associated with electronic processing device 36 is the previously mentioned real time clock (RTC) 46, which provides accurate date and time information to the telematics unit 14 hardware and software components that may require and/or request date and time information. In an example, the RTC 46 may provide date and time information periodically, such as, for example, every ten milliseconds.

The electronic memory 38 of the telematics unit 14 may be configured to store data associated with the various systems of the vehicle 12, vehicle operations, vehicle user preferences and/or personal information, and the like. In an example, the electronic memory 38 also stores information received from the offboard server 110, where such information pertains to an entity represented by an object that is then-currently within the field of view of a vehicle occupant, such as, e.g., the vehicle driver. The information may be stored in the form of text, graphics, audio (such as in the form of an audible message or a tone), and/or a musical work (e.g., a song or musical score). Further, the information may be stored temporarily, and is thus removable (e.g., by deleting the information) from the electronic memory 38 after the information has been displayed.

The electronic memory 38 may also store a user profile, which may include personal information of the user (e.g., the user's name, garage address, billing address, home phone number, cellular phone number, etc.), as well as user-selected preferences (e.g., how information is to be displayed and restrictions on the amount and/or appearance of the information to be displayed). The user profile may be created at the time the user (e.g., the vehicle driver) sets up his/her account with the telematics call center 24 (such as upon subscribing for telematics services) via the remotely accessible page 122, by speaking with an advisor 62, 62' at the call center 24 during a phone call, etc. The user profile may be downloaded to the telematics unit 14 upon creating the user profile, and updates may be downloaded each time the user profile is updated. The user profile may otherwise remain at the call center 24, and the telematics unit 14 may submit a request to the call center 24 for the user preferences set in the profile each time the information is to be displayed. In another example, the offboard server 110 may request the user preferences from the database(s) 72 at the call center 24, and transmit the user preferences to the telematics unit 14 along with the information.

The telematics unit 14 provides numerous services alone or in conjunction with the call center 24, some of which may not be listed herein, and is configured to fulfill one or more user or subscriber requests. Several examples of these services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering. It is to be understood that when these services are obtained from the call center 24, the telematics unit 14 is considered to be operating in a telematics service mode.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. In one example, an Evolution Data Optimized (EVDO) Rev B (3G) system (which offers a data rate of about 14.7 Mbit/s) or a Long Term Evolution (LTE) (4G) system (which offers a data rate of up to about 1 Gbit/s) may be used. These systems permit the transmission of both voice and data simultaneously. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human/machine interface (HMI) technology known in the art. Conversely, speaker(s) 30, 30' provide verbal output to the vehicle occupants and can be either a stand-alone speaker 30 specifically dedicated for use with the telematics unit 14 or can be part of a vehicle audio component 60, such as speaker 30'. In either event and as previously mentioned, microphone 28 and speaker(s) 30, 30' enable vehicle hardware 26 and telematics service call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the telematics service provider call center 24 (whether it be a live advisor 62 or an automated call response system 62') to request services, to initiate a voice call to another mobile communications device, etc.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system (e.g., speaker 30'), or may utilize speaker 30 via arbitration on vehicle bus 34 and/or audio bus 58. In an example, the processor 36 may receive an instruction to use an aural/audible modality to display information received from the offboard server 110. In this case, the information may be displayed to the vehicle occupant(s) by playing any of an audible message, a tone, or a musical work through the audio component 60 and over the speakers 30, 30'.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, speed sensors, magnetometers, emission detection and/or control sensors, environmental detection sensors, and/or the like. In the examples disclosed herein, one of the vehicle sensors 64 is sensor 132, which is designed to be used with a haptic modality, and in particular to sense human gesture(s) in order to perform one or more functions that pertain to the information being displayed. Sensor 132 is discussed further in references to FIGS. 8A, 8B and 9-11.

One or more of the sensors 64 enumerated above may be used to obtain vehicle data for use by the telematics unit 14 or the call center 24 (when transmitted thereto from the telematics unit 14) while the vehicle 12 is being tracked. For instance, data from the speed sensors may be used to determine a then-current vehicle speed. Additionally, examples of sensor interface modules 66 include powertrain control, climate control, body control, and/or the like. In one example, the sensor module 66 may be configured to send signals including data obtained from one or more of the sensors 64 to the telematics unit 14, and the telematics unit 14 may forward the data (e.g., in the form of packet data during a VDU event) to the offboard server 110 for use in the examples of the method disclosed herein.

In an example, each of the vehicle sensors 64 (including sensor 132) is associated with its own processor (not shown), which may include computer program(s) for obtaining information from the sensors 64 and either utilizing them to perform various vehicle functions and/or to send the information (e.g., as signals) to another processor in the vehicle 12 (e.g., the processor 36) to be utilized in other computer program(s). For instance, the speed sensor may be associated with its own processor that obtains speed signals from the speed sensor and transmits those signals to the processor 36 of the telematics unit 14 via the bus 34. The speed signals include information pertaining to the instantaneous speed of the vehicle 12, and the processor 36 forwards the speed signals, e.g., in the form of packet data to the offboard server 110. The instantaneous (or then-current) vehicle speed may be used, by the offboard server 100, to determine the then-current location of the vehicle 12 and perhaps where the vehicle 12 is heading during its travels.

The vehicle hardware 26 includes the display 80, which may be operatively directly connected to or in communication with the telematics unit 14, or may be part of the audio component 60. The display 80 may be any human-machine interface (HMI) disposed within the vehicle 12 that includes audio, visual, haptic, etc. The display 80 may, in some instances, be controlled by or in network communication with the audio component 60, or may be independent of the audio component 60. Examples of the display 80 include a VFD (Vacuum Fluorescent Display), an LED (Light Emitting Diode) display, a driver information center display, a radio display, an arbitrary text device, a heads-up display (HUD), a touchscreen display, an LCD (Liquid Crystal Display), and/or the like. The display 80 may be referred to herein as a graphic user interface (GUI).

It is to be understood that the vehicle 12 includes other components, such as digital light projectors 130, the sensor 132, a tracking device 166, etc., each of which will be described further herein in reference to one or more of the other figures. It is to be understood that each of these additional components is operatively connected to the vehicle bus 34 so that they are in selective communication with the telematics unit 14.

As mentioned above, the system 10 includes the carrier/communication system 16. A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. It is to be understood that various cell tower/base station/MSC arrangements are possible and could be used with the wireless portion of the system 16. For example, a base station 19 and a cell tower 18 may be co-located at the same site or they could be remotely located, or a single base station 19 may be coupled to various cell towers 18, or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects the wireless portion of the carrier/communication network 16 to the call/data center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, wireless networks, such as wireless local networks (WLANs) or networks providing broadband wireless access (BWA), or any combination thereof.

The call center 24 of the telematics service provider (also referred to herein as a service center) is designed to provide the vehicle hardware 26 with a number of different system back-end functions. According to the example shown in FIG. 1, the call center 24 generally includes one or more switches 68, servers 70, databases 72, live and/or automated advisors 62, 62', processing equipment (or processor) 84, as well as a variety of other telecommunication and computer equipment 74 that is known to those skilled in the art. These various telematics service provider components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs enabling the processor 84 to accomplish a variety of call center 24 functions. Further, the various operations of the call center 24 are carried out by one or more computers (e.g., computer equipment 74) programmed to carry out some of the tasks of the call center 24. The computer equipment 74 (including computers) may include a network of servers (including server 70) coupled to both locally stored and remote databases (e.g., database 72) of any information processed.

Switch 68, which may be a private branch exchange (PBX) switch, routes incoming signals so that voice transmissions are usually sent to either the live advisor 62 or the automated response system 62', and data transmissions are passed on to a modem (similar to modem 42) or other piece of equipment (not shown) for demodulation and further signal processing. The modem preferably includes an encoder, as previously explained, and can be connected to various devices such as the server 70 and database 72.

It is to be appreciated that the call center 24 may be any central or remote facility, manned or unmanned, mobile or fixed, to or from which it is desirable to exchange voice and data communications. As such, the live advisor 62 may be physically present at the call center 24 or may be located remote from the call center 24 while communicating therethrough.

The offboard server 110 may be part of the call center 24 (shown in solid lines in FIG. 1), or may be an entity that is separate from the call center 24 (shown in dotted lines in FIG. 1). The offboard server 110 may be used to receive tracking information uploaded thereto from the telematics unit 14, and to obtain information pertaining to an entity represented by an object that is then-currently within the field of view of the vehicle driver or other occupant. In instances where the offboard server 110 is separate from the call center 24, the offboard server 110 may include processing equipment (or processor) 112, as well as communications equipment 114.

The processor 112 generally includes software programs containing computer readable code embedded on a non-transitory, tangible medium for utilizing uploaded vehicle data to identify an entity represented by an object that is then-currently within proximity of the vehicle 12. Identification of the entity may be accomplished by the offboard server 110, for example, by accessing and retrieving information from the content source(s). How the content source is accessed by the offboard server 110 may vary depending upon the type of content source, and detailed examples will be described hereinbelow. Generally, the offboard server 110 utilizes the communications equipment 114 to establish either a cellular connection or a mobile Internet connection (e.g., a packet data connection) so that the information may be accessed from the desired content source. The communications equipment 114 may also be used for establishing data connections with the telematics unit 14, e.g., to transmit the information obtained from the source to the telematics unit 14.

In instances where the offboard server 110 is part of the call center 24, one or more components of the call center 24 may act as a data aggregator for both vehicle data and for information retrieved from the content source. The offboard server 110, in these instances, may be in selective and operative communication with the telematics unit 14 via the communication system 16. In these examples, the offboard server 110 may receive and bin the vehicle data included in the data message(s) from the vehicle 12. Upon receiving the vehicle data, the automated advisor 62' may be invoked to collect the desired information from the content source(s). For instance, the automated advisor 62' may initiate an Internet connection to retrieve information from a social networking page (e.g., webpage 94) or a cellular connection with a user's mobile phone to retrieve address book information. In other instances, the offboard server 110 is also capable of running computer readable code/software routines for initiating connections to retrieve information from the content source.

The communications network provider 90 generally owns and/or operates the carrier/communication system 16. The communications network provider 90 includes a mobile network operator that monitors and maintains the operation of the communications network 90. The network operator directs and routes calls, and troubleshoots hardware (cables, routers, network switches, hubs, network adaptors), software, and communications. It is to be understood that, although the communications network provider 90 may have back-end equipment, employees, etc. located at the telematics service provider call center 24, the telematics service provider is a separate and distinct entity from the network provider 90. In an example, the equipment, employees, etc. of the communications network provider 90 are located remote from the call center 24. The communications network provider 90 provides the user with telephone and/or Internet services, while the telematics service provider provides a variety of telematics-related services (such as, for example, those discussed hereinabove). The communications network provider 90 may interact with the call center 24 to provide services (such as emergency services) to the user.

While not shown in FIG. 1, it is to be understood that in some instances, the call center 24 operates as a data center, which receives voice or data calls, analyzes the request associated with the voice or data call, and transfers the call to an application specific call center associated with the telematics service provider. In these instances, the telematics service provider may include a plurality of application specific call centers that each communicates with the data center 24, and possibly with each other. It is further to be understood that the application specific call center(s) may include all of the components of the data center 24, but is a dedicated facility for addressing specific requests, needs, etc. Examples of application specific call centers include emergency services call centers, navigation route call centers, in-vehicle function call centers, or the like.

The call center 24 components shown in FIG. 1 may be configured as a Cloud Computer, i.e., an Internet- or world-wide-web-based computing environment. For example, the computer equipment 74 may be accessed as a Cloud platform service, or PaaS (Platform as a Service), utilizing Cloud infrastructure rather than hosting computer equipment 74 at the call center 24. The database 72 and server 70 may also be configured as a Cloud resource. The Cloud infrastructure, known as IaaS (Infrastructure as a Service) typically utilizes a platform environment as a service, which may include components such as the processor 84, database 72, server 70, and computer equipment 74. In an example, application software and services (such as, e.g., navigation route generation and subsequent delivery to the vehicle 12) may be performed in the Cloud via the SaaS (Software as a Service). Subscribers, in this fashion, may access software applications remotely via the Cloud. Further, subscriber service requests may be acted upon by the automated advisor 62', which may be configured as a service present in the Cloud.

It is to be understood that the system 10 may include other components not described above. These components (e.g., a mobile communications device 98, etc.), although shown in FIG. 1, will be described in connection with various examples of the method below.

Examples of the method of providing information to the vehicle 12 will now be described herein in conjunction with all of the figures. At the outset, the examples of the method are accomplished, and are described hereinbelow, when the vehicle electronics are in an ON state. In some instances, the method(s) is/are performed when the electronics are on, but the vehicle 12 engine is off. In other instances, the method(s) is/are performed when both electronics are on and the vehicle is in motion. In the latter instances, information may be obtained and presented to the vehicle occupant(s) dynamically (in real time) as the vehicle 12 is in motion.

It is to be understood that some of the examples of the method will be described below utilizing equipment operatively associated with the telematics unit 14 of the vehicle 12 to produce an augmented image that will be displayed, e.g., as an overlay on and/or adjacent to an object outside of the vehicle 12. As previously mentioned, the object represents an entity identified by the information contained in the augmented image being placed on and/or adjacent to the object. Details of the equipment that may be used to produce the augmented image will be described below.

Other examples of the method will be described below utilizing other equipment (such as the in-vehicle audio component 60) to produce an audio message to be played to the vehicle occupant(s), where such audio message includes information pertaining to the object representing the entity.

Additionally, the examples of the method will be described below with the user being the vehicle driver. From the vehicle driver's point of view, the content is specifically selected to be displayed to the vehicle driver when an object representing an entity is within the vehicle driver's field of view. It is to be understood that the method may be modified as necessary to include other vehicle occupants (e.g., a passenger seated in the passenger seat of the vehicle 12, a passenger seated on the left or right side of the back seat of the vehicle 12, etc.). In these cases, some of the content displayed may be specific for the vehicle driver when an object representing an entity is within the field of view of the vehicle driver, while some of the other content displayed may be specific for the other vehicle occupant (i.e., not the vehicle driver) when an object representing an entity is within the field of view of the other vehicle occupant. Details of the examples of the method where content is displayed for several vehicle occupants at the same time is provided below.

It is further to be understood that the examples of the method may also be modified to display content specific for a single vehicle occupant who may not necessarily be the vehicle driver.

Figure 2:
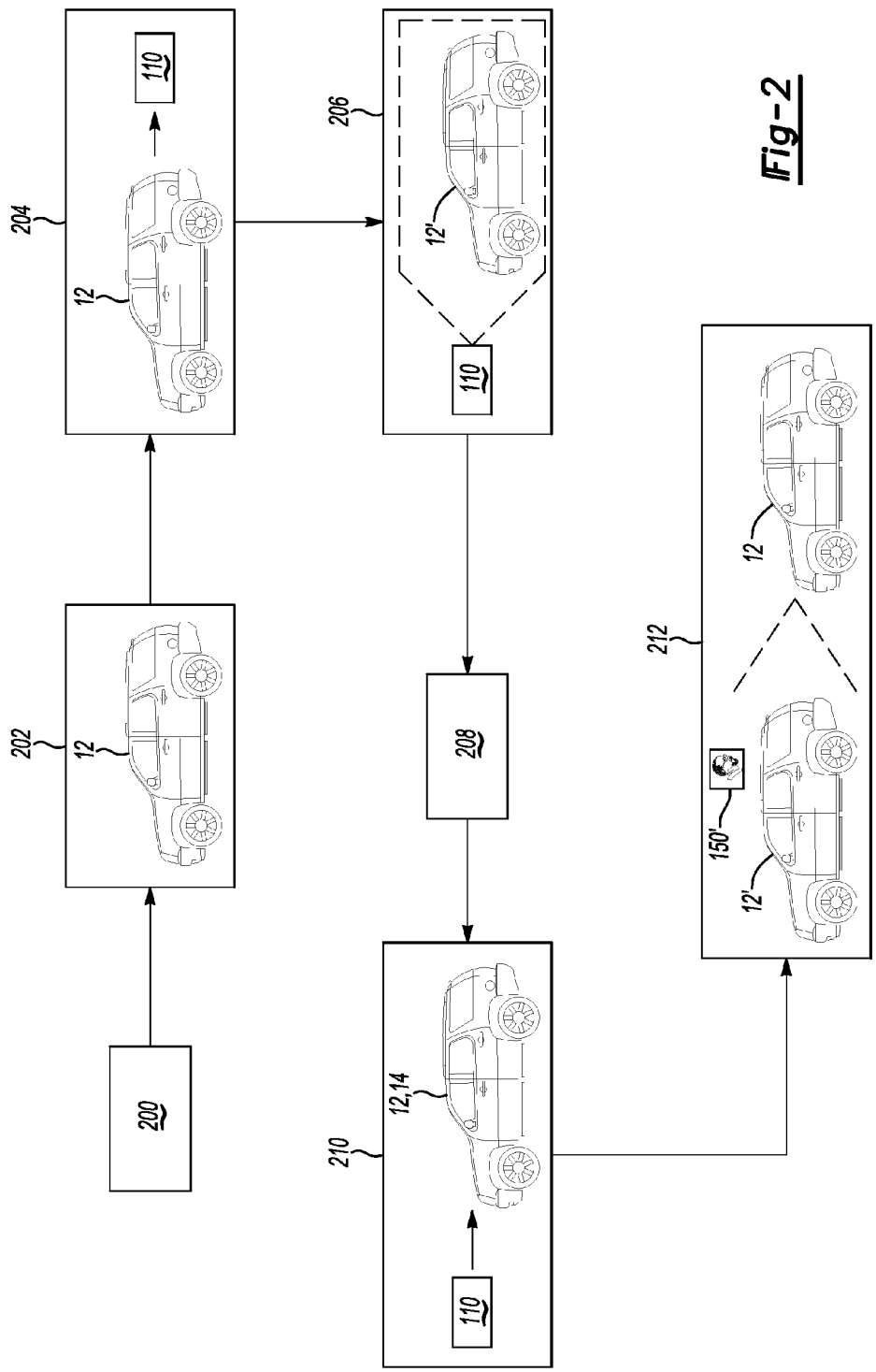
FIG. 2 is a schematic flow diagram of an example of a method of providing information to a vehicle.

Referring now to FIG. 2, an example of the method includes selecting content that is associated with an entity, and a source from which information pertaining to the content is retrievable. This is shown by step 200 in FIG. 2. As used herein, an "entity" refers to a person, organization, business, or other type being that has a real and distinct existence. One example of an entity may be a particular person, such as J. Smith having a U.S. Social Security Number of XXX-XX-XXXX. Another example of an entity may be a particular point of interest such as a place of business, e.g., a particular restaurant (Bob's Place, Mary's Eatery, or The ABC Avenue Diner, for instance). Yet another example of an entity includes a particular landmark, such as the White House, the Lincoln Monument, etc.

Further, the term "content" refers to a collection of information (e.g., the information that is to be displayed to vehicle occupant) that is associated with a particular entity. For example, if the entity is J. Smith, then the content associated with J. Smith may include J. Smith's full name, age, home address, mobile dialing number, and other personal information of J. Smith. In another example, if the entity is Alex's Department Store, then the content associated with Alex's Department Store may include the type of merchandise carried by Alex's Department Store, store locations, store hours, and/or the like. It is to be understood that there is no limit to the type of content that may be selected by the user.

The "content source", "source of the content", or the like may be a database, a document (e.g., webpage 94), or the like that is accessible via the Internet or a cellular connection, and from which the information of the content may be retrieved by the offboard server 110. In an example, the content source may also be a local database resident on a mobile communications device 98 (shown in FIG. 1) or on the telematics unit 14. When the content source is available via the Internet, the source may be, for example, a website, a publically accessible database, or a source that is part of a Cloud (e.g., a mobile device address book stored on iCloud®, available from Apple Inc.). In one example, the content source may be a webpage upon which the content (i.e., the collection of information) pertaining to the entity is posted (or uploaded to the host server of the webpage).

In an example, the content source is the user's personal webpage 94 that is hosted by a social and/or professional networking website, examples of which include Facebook™, TWITTER®, LinkedIn®, Foursquare™, TUMBLR®, Diaspora™, Quora™ and MYSPACE®. It is to be understood that information posted on the webpage 94 may be referred to as a "post", and this term may be used to describe uploaded information for most online networking websites. However, if the user's personal webpage 94 is associated with Twitter™ as the networking site, the uploaded information may otherwise be referred to as a "tweet".

The content contained in the user's networking webpage 94 may include personal information posted thereon by the user, or by friends of the user (e.g., in a blog). Examples of the information may include text-based posts containing general information about the user, e.g., information about the user's interests and/or hobbies, information about the user's business(es) and/or work experience (e.g., in the form of a resume, a curriculum vitae (CV), or the like), information about the user's friends (e.g., friends' names, phone numbers, addresses, etc.), and/or the like. The information may also include pictures, diagrams, drawings, illustrations, videos, audio clips, music, and/or the like. In some instances, the information available from the user's networking webpage 94 may include information from an address book associated with the page 94 and/or friend's posts, pictures, etc. that are viewable via the page 94.

The content source may otherwise be a webpage owned or run by an entity other than the user, such as a particular retail business, a particular restaurant, a particular person, or the like. It is to be understood that webpages owned or run by an entity other than the user may be used as a content source so long as the offboard server 110 has permission to access such websites and to retrieve information from such websites. In some cases, the offboard server 110 is automatically authorized to access the information on the websites, e.g., because the websites are public facing. Authorized access to the websites may otherwise be accomplished by setting up an account with the owner of the other website. In these instances, the offboard server 110 may access the website by providing a digital certificate, exchanging keys with the website, or via another suitable authentication mechanism.

The content source may, in another example, be an address book, such as a user's address book stored in a database that is accessible via a Cloud. In this example, the address book may be partially or fully cached in the telematics unit 14 or the mobile communications device 98 and synched with the Cloud based address book. In general, the address book is a database that includes a plurality of the user's contacts, or a contact list. The contact list refers to a collection of contacts created by a user or another authorized user, and/or contacts transmitted to the user's address book from another source (e.g., a synched device, a forwarded contact, etc.). Within an address book, each contact may include standard fields, such as the first name of the contact, the last name of the contact, a garage address of the contact, a work address of the contact, a home telephone number, a work telephone number, a mobile telephone number, a facsimile number, an e-mail address, and/or other personal information. The fields may be filled with metadata such as an identifier of the contact (such as the person's name, nickname, or the like, which may be referred to as a caller identification or a caller ID), a mobile dialing number MDN of the other mobile device (which may be referred to as a phone number), and/or the like. It is to be understood that the metadata contained in the address book may be used as content for purposes of the instant disclosure.

The contacts within the address book may be arranged in alphabetical order based on the contacts' last name, or may be arranged in a user-selected order. In an example, a contact list of the address book may contain groupings of contacts, such as a group of contacts that are members of the user's family or business, a group of contacts that are members of the user's recreation or hobby, a group of favorite contacts, or the like.

Yet another example of the content source includes a publically accessible database, which is accessible to the general public (in some cases, without a fee) via the world-wide-web (e.g., via a website, a Cloud, etc.). Examples of such databases may include library databases, educational databases, public records databases, digital encyclopedias, and/or the like.

Still another example of the content source includes a database (e.g., an address book) stored in the telematics unit 14 or a mobile communications device (such as, e.g., the user's mobile phone 98, which is discussed in further detail below). As mentioned above, in instances where the content source is the telematics unit 14, all or part of the content may be cached in the memory 38 and then synced with a Cloud-based content source.

When the content is stored in the mobile device 98, the device 98 is a smart device that includes an application designed to allow the device 98, with user permission, to access information stored on the device 98 and to push that information to the server 110. An example of this application is briefly described below, and is identified herein by reference numeral 103.

The content source may be selected by the user (e.g., vehicle owner, driver, etc.) via a number of ways. In an example, the content source may be selected by accessing the webpage 122 owned by the telematics service provider (e.g., by entering an acceptable login and password), and either selecting (e.g., from menu options) or inputting the desired content source into the webpage 122. For example, the user may select to have any information displayed to the vehicle 12 be directly retrieved from the user's Facebook™ page (which, in this case, is the webpage 94). In another example, the user may select to have any information displayed to the vehicle 12 be directly retrieved from the user's Facebook™ page and/or his/her contact list in his/her mobile device 98.

Another way of selecting the content source includes calling the call center 24, and speaking with an advisor 62, 62' who has access to the user's profile and the webpage 122. The advisor 62, 62' may update the user's profile with the content source selected during the phone call. The advisor 62, 62' may utilize the webpage 122 to make and save selection(s).

The content source may further be selected using the application 103 resident on a mobile communications device 98. The mobile device 98 may be chosen from any mobile device capable of receiving and sending voice calls and/or text messages (such as short message service (SMS) messages or multi-media service (MMS) messages) and/or e-mails, etc. Examples of the mobile device 98 include a smartphone, or the like. For some examples, the mobile device 98 is chosen from one that is capable of executing the application 103, which is stored in the memory 105 operatively associated with the mobile device 98. In another example, the application 103 may also be used to access the webpage 122 owned by the call center 24, and to select the content source.

As shown in FIG. 1, the mobile device 98 may further include another application 104 stored in the memory 105, and which is executable by the processor 101. The other application 104 may be used to manage certain programs run by the device 98, such as the user's contact list (i.e., address book).

In another example, the content source may be selected by the offboard server 110 by tracking the set of social media that the user/vehicle occupant utilizes. If, e.g., the user predominately uses Facebook™, then the offboard server 110 automatically selects Facebook™ as the primary content source. This selection may, however, be overridden by the user, e.g., by accessing the webpage 122, calling the call center 24, etc. and requesting that the content source be changed.

It is to be understood that the user may select a single content source from which information to be displayed to the vehicle occupants may be retrieved, or may select two or more different content sources. In the latter case, the user may further select the type and/or amount of information that may be retrieved from the respective content sources.

In an example, selecting content may also include selecting preferences associated with the entities, the content, content retrieval, the display of the content, and/or the like. The selection of the preferences may be accomplished at the time the content is selected, and may be updated anytime afterwards (by the user or an authorized user) via any of the methods described above for selecting the content (e.g., accessing the webpage 122, calling the call center 24, and/or using the application 103 resident on the mobile device 98).

The type of information to be displayed may be selected, by the user, as a preference. In an example, the type of information to be displayed may depend, at least in part, on the entity associated with the information to be displayed. For instance, if the entity is a friend of the user, then the user may select to have the friend's name displayed when an object representing the friend (such as the friend's vehicle) is within the field of view of the vehicle driver. In another instance, if the entity is a fast food restaurant, then the user may select to have the restaurant's name and hours of operation displayed to the vehicle 12 when the restaurant is within the field of view of the vehicle driver.

In some cases, the user may select, as preferences, particular entities whose information is to be displayed when an object representing the entity is within the field of view of the vehicle driver. Thus, information pertaining to those entities that were not selected by the user as a preference is not displayed when an object representing the entity falls within the field of view of the vehicle driver while driving. Examples of entities that are selected may include a single entity (e.g., a particular person), or any entity classified as being part of a particular type or group, such as all of the user's friends of the user's online networking group, all fast food restaurants, all department stores, etc. When a particular entity or entities are selected, information pertaining to any other unselected entity (e.g., fuel stations, grocery stores, etc.) is not displayed. In an example, the user may also select particular entities of different types or groups of entities, such as certain friends of the user's online networking group, while excluding all of the user's other friends. In an example, information pertaining to only those user-selected entities will be displayed as a default setting.

In some instances, the user may select, as a preference, an object to represent a particular entity. For instance, the entity may be a person, such as J. Smith mentioned above, and the object may be selected to be J. Smith's vehicle. J. Smith's vehicle may be identified, e.g., by its vehicle identification number (VIN) or the mobile dialing number (MDN) of the telematics unit onboard J. Smith's vehicle. The offboard server 110 uses the identification information of J. Smith's vehicle to i) identify J. Smith as the entity, and ii) transmit the user-selected information of J. Smith to the user's vehicle 12 so that such information may be displayed to the vehicle occupants.

It is to be understood that the user does not always have to select an object to represent an entity. This situation may occur with commonly known entities, such as those that have respective objects that represent the entities and are generally well known to the public. For example, the MCDONALD'S® fast food restaurant may be represented by the golden arches sign displayed on each of the MCDONALD'S® restaurant buildings.

In an example, the user's preferences may also provide how the information is to be displayed to the vehicle occupants via the examples of the method described herein. For instance, the information may be visually displayed to the vehicle occupants (e.g., as an augmented overlay) or audibly displayed to the vehicle occupants (e.g., as audio output from the in-vehicle audio component 60). Further details for the visual and audio display of the information will be described below in conjunction with FIGS. 5, 6, and 12.

It is to be understood that the selected content and content source are stored in the user profile at the call center 24. The user-selected preferences are also stored in the user profile. In an example, the user profile is stored in the database 72 at the call center 24, and in instances where the offboard server 110 is part of the call center 24, the offboard server 110 refers to the user profile to obtain the user-selected content source, content, and preferences. In instances where the offboard server 110 is separate from the call center 24, the offboard server 110 requests the user-selected content source, content, and preferences from the call center 24. The call center 24 (via its communications equipment) sends the requested information, e.g., in the form of packet data. In yet another example, the user profile is stored in the telematics unit 14 of the vehicle 12, and the offboard server 110 submits a request to the telematics unit 14 for the user-selected content source, content, and preferences via, e.g., a packet data session.

Once the content, the content source, and possibly preferences are selected by the user, the telematics unit 14 tracks the vehicle 12 in real time. This is shown by reference numeral 202 in FIG. 2. Tracking may involve continuously obtaining (e.g., every second, every two seconds, every five seconds, etc.) vehicle data from various vehicle systems (via the bus 34) such as vehicle location data from the GPS component 44, vehicle speed from vehicle speed sensors 64, and possibly other sensory data such as, e.g., vehicle maintenance data (e.g., oil life, diagnostic messages, and fluid levels such as fuel level and windshield washer fluid level) while the vehicle 12 is in operation. The telematics unit 14 formats the vehicle data into packet data, and uploads the packet data to the offboard server 110 during a vehicle data upload (VDU) event utilizing the VDU unit 91. This is shown by 204 in FIG. 2.

Figure 3A:
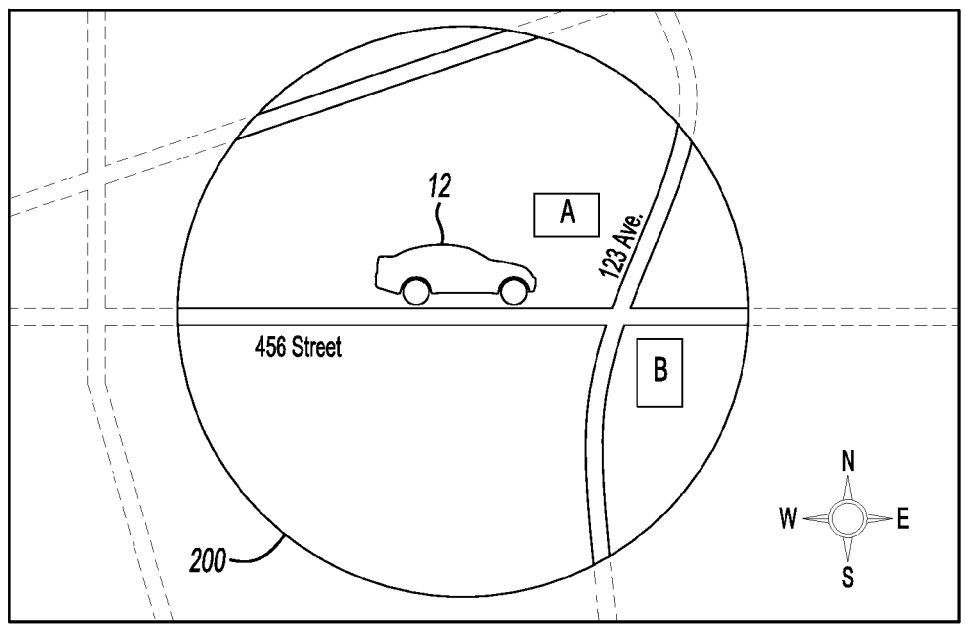
FIGS. 3A and 3B are illustrations of maps with a geographic boundary constructed around a vehicle traveling along a roadway, where

The packet data is received by the offboard server 110, and the processor 112 of the offboard server 110 uses the vehicle data to determine (via suitable software programs) where the vehicle 12 is then-currently located. In an example, the processor 112 constructs a geographic boundary around the vehicle 12 based, at least in part, on the then-current location of the vehicle 12. In some instances, the geographic boundary will be based upon GPS information alone, for example, when the vehicle is in park mode and the electronics are on. This may be desirable when the user is sitting in a parking lot, waiting for a train to pass, etc. An example of a geographic boundary 200 is shown in FIG. 3A. The geographic boundary 200 may be constructed as a circle drawn around a center point and has a predetermined radius. The predetermined radius may be based on geographic considerations. For instance, if the vehicle 12 is traveling through city, the radius of the geometry boundary 200 may be smaller than if the vehicle 12 is traveling through a rural area. This may be due, at least in part, to a smaller number of entities that may be within proximity of the vehicle 12 while the vehicle 12 is traveling through a rural area compared to when the vehicle 12 is traveling through a city. The predetermined radius may also be based on the speed of the vehicle 12. For instance, if the vehicle 12 is traveling at a relatively high speed, the radius of the geometry boundary 200 may be larger than if the vehicle 12 is traveling at a relatively slow speed.

The center point of the geographic boundary 200 may be determined from the then-current location of the vehicle 12, which may continuously change because the vehicle 12 is moving. In an example, the geographic boundary 200 continuously changes as the center point (i.e., the location of the vehicle 12) changes. In other words, the geographic boundary 200 may be continuously updated as the vehicle location changes in real time. In FIG. 3A, the vehicle 12 is shown traveling along 456 Street, and the geographic boundary 200 is constructed around the vehicle 12 using the vehicle 12 as the center point. This geographic boundary 200 is taken at time $t_1$ during the vehicle's travels, where entities A and B are shown inside the boundary 200 in front of the vehicle 12. Since the vehicle 12 at $t_1$ is approaching the entities A and B, an overlay may be displayed on and/or adjacent to each of the entities A and B so that the vehicle driver can view them. Examples of the overlay are further described in reference to, for example, FIGS. 5 and 6.

Figure 3B:
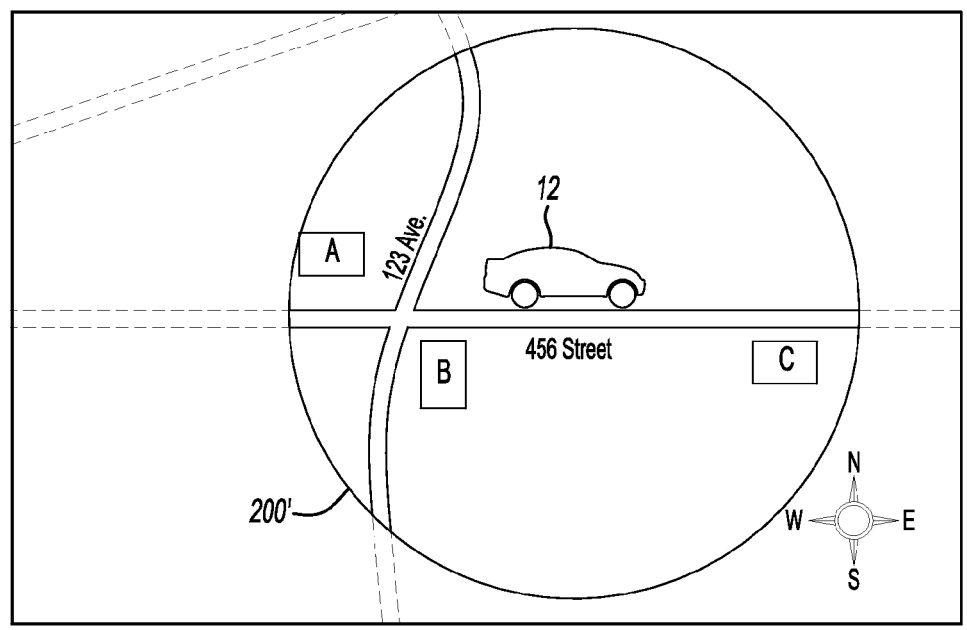

FIG. 3B shows another geographic boundary 200', which is an updated version of the geographic boundary 200 of FIG. 3A, but the other geographic boundary 200' is taken at time $t_2$. The updated geographic boundary 200' is constructed around the vehicle 12 (which, again, is used as the center point of the boundary 200') while the vehicle 12 is still traveling along 456 Street at time $t_2$ (which is a time occurring after $t_1$). The updated geographic boundary 200' may be constructed periodically, such as every 30 seconds, every minute, etc. The updated geographic boundary 200' may otherwise be constructed whenever the vehicle 12 reaches the perimeter of the boundary 200', at which time another updated geographic boundary is constructed. It is to be understood that as many new, updated geographic boundaries are constructed as needed or desired while the vehicle 12 is in motion.

Upon constructing the geographic boundary 200, and each time an updated geographic boundary 200' is constructed, the processor 112 of the offboard server 110 identifies one or more entities that are within proximity of the vehicle 12. This is shown at 206 in FIG. 2. In an example, the entity that is within proximity of the vehicle 12 is one that falls within the geographic boundary 200, 200', such as the object (in this case vehicle 12') of a particular person (e.g., J. Smith) as shown in FIG. 2. In instances where the entity is mobile, the processor 112 determines that the entity is within the geographic boundary 200, 200' by comparing coordinate location information of the vehicle 12' with the area within the boundary 200, 200'. If the user of the vehicle 12' is a subscriber of the telematics service provider, the coordinate location information of the vehicle 12' may be obtained, e.g., by requesting such information from a telematics unit 14 onboard that vehicle 12'. Alternatively, a mobile phone in the vehicle 12' may have a GPS receiver resident thereon, and via an appropriate application, the GPS receiver of the device may be used as a position tracking device. The mobile device may also be used as a gateway for outside communications (e.g., cellular and/or Internet) with, e.g., the vehicle 12' when the mobile device is connected to the telematics unit of the vehicle 12' via a BLUETOOTH® connection.

It is further to be understood that multiple entities may falls within the geographic boundary 200, 200', and thus be within proximity of the vehicle 12 simultaneously.

In instances where the entity is stationary (e.g., a building representing a retail business or the like), the processor 112 determines that the entity is within the geographic boundary 200, 200' by comparing coordinate location information of the building representing the entity with the area within the boundary 200, 200'. The coordinate location information of the building representing the entity may be retrieved from a known source, such as, e.g., a public database.

In an example, the processor 112 of the offboard server 110 detects that the object representing the entity is within proximity of the vehicle 12 when the object is inside of the geographic boundary 200, 200' constructed around the vehicle 12. Upon making this detection, the offboard server 110 obtains information pertaining to the entity from the user-selected content source, as shown by 208 in FIG. 2. The offboard server 110 then transmits the information to the telematics unit 14 of the vehicle, as shown by 210 in FIG. 2.

Figure 4:
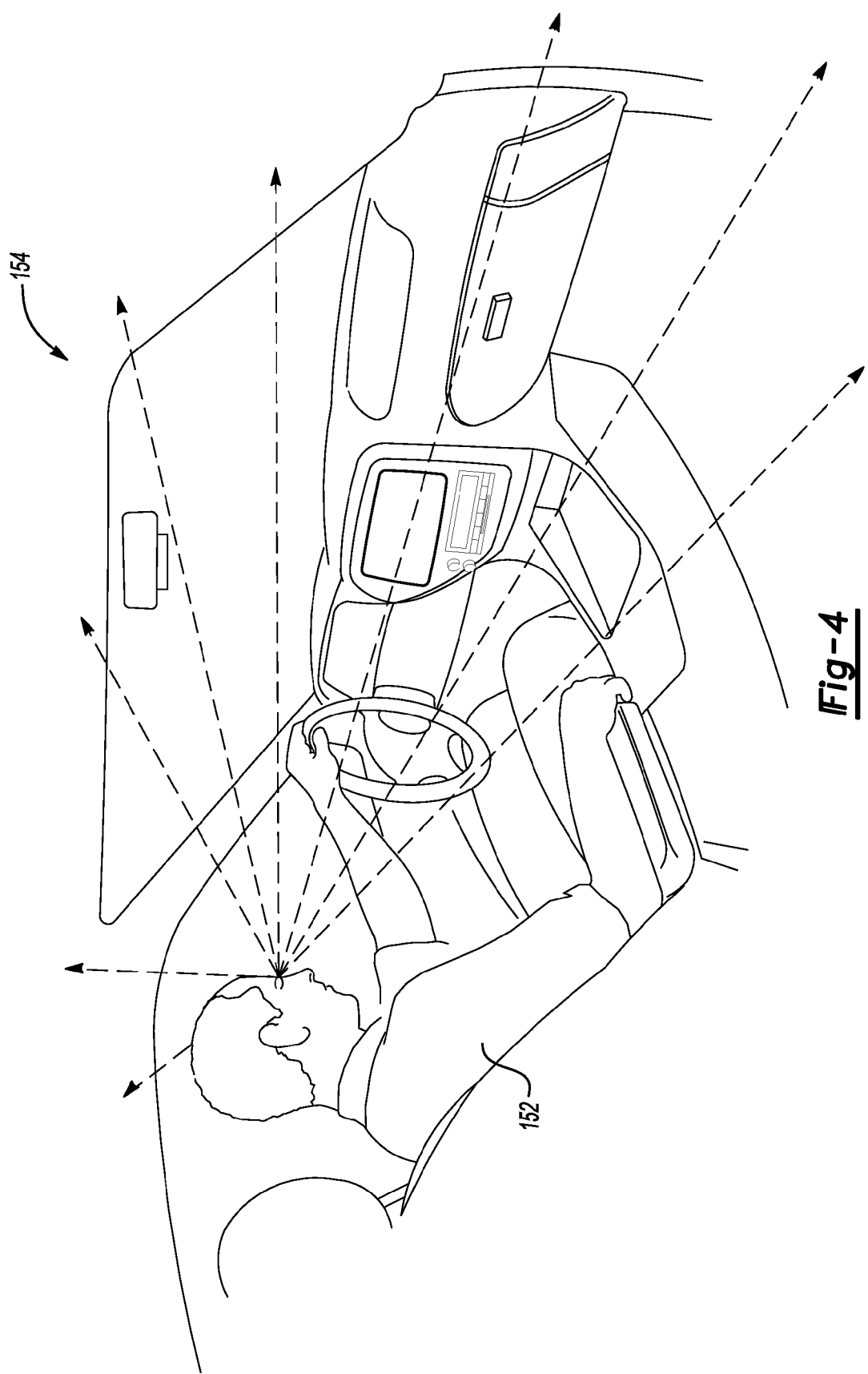
FIG. 4 semi-schematically depicts an example of a vehicle interior including a vehicle driver, where arrows are used to depict a field of view of the vehicle driver.

Upon receiving the information from the offboard server 110, the telematics unit 14 sends a command to an appropriate vehicle system (via the bus 34) to display the information. The information is then displayed as an augmented image (e.g., 150') on and/or adjacent to the object (e.g., the vehicle 12' as shown in FIG. 2) representing the entity. This is shown by 212 in FIG. 2. For instance, the information is displayed to the vehicle occupants so that the information is associated with the object representing an entity that is within the field of view of the vehicle driver. As used herein, an object that is "within the field of view of a vehicle occupant" or the like refers to the positioning of the object with respect to the vehicle 12 in real time, such that a vehicle occupant (e.g., the driver), for example, can perceive the object while he/she is facing toward the front of the vehicle 12. Perception of the object may be based, at least in part, on where the vehicle occupant is sitting inside the vehicle interior 154 (as shown in FIG. 4), and includes areas outside of the vehicle 12 that are naturally observable when the vehicle occupant's head is facing toward the front of the vehicle 12. The object may also be perceived in areas outside of the vehicle 12 that are naturally observable when the vehicle occupant's head turns from the neck to the right and to the left. An example of the field of view of a vehicle driver is shown in FIG. 4, where the dotted arrows depict some of the directions outside of the vehicle 12 that are perceivable by a vehicle driver 152. These perceivable directions define, in part, the field of view of the vehicle driver 152. In an example, the field of view of the vehicle driver may be referred to as an "area of interest", which is a conical area in the direction of motion of the vehicle 12 ahead of the vehicle 12 with a 120 degree field of view. The area may also extend about 800 meters in distance from the driver. The field of view may be calibrated, and may, in some cases, be dynamic based upon the geographic region within which the vehicle 12 is being operated.

It is to be understood that the information is displayed based, e.g., on a modality that is a user-selected modality, a default modality setting, or an offboard server-suggested modality. Examples of these modalities include a visual modality, an aural modality, and/or a haptic modality.

The processor 36 refers to the user profile for the user-selected modality. If there is no user-selected modality available, the processer 36 will apply a default modality setting. Because the offboard server 110 is constantly receiving vehicle data, the offboard server 110 may also send a modality to the telematics unit 14 commanding the telematics unit 14 to override the default modality. If the user-selected modality is available, the telematics unit 14 will use the user-selected modality. However, the offboard server 110 may send a command to the telematics unit 14 to override the user-selected modality. For example, the user-selected modality may be overridden in instances where the driver is engaged in an activity, such as being engaged in certain driving maneuvers, for instance, during hard braking or cornering. The user-selected modality may also be overridden in instances where inclement weather or heavy traffic is detected, indicating a higher driver activity. When the user-selected modality is overridden, in an example, the data may not be displayed.

In an example, the user may have selected to restrict an amount of content to be displayed. For instance, if a vehicle belonging to a particular person is within the field of view of the vehicle driver, then the amount of content displayed may be restricted to just the person's name instead of the person's name, phone number, and address. Further, the presentation of the information may be restricted, e.g., by selecting to have an entity's photo presented as opposed to his/her name or any other information.

The restriction may be implemented via one or more filters in the user profile and/or in the content source (e.g., an address book). If, for instance, the user selects to have a photograph displayed of a particular person without other information of the person (e.g., the person's name, address, etc.), then a bit string representing the restriction is applied for the person. As an illustrative example, the bit string may be represented by a binary digit string, such as 000000 meaning no restriction is applied, 000001 meaning not to display the person's name but everything else, 000010 meaning not to display the person's address but to display the person's name, etc.

Restriction on the type of information to be displayed may also occur, and the restriction may be based, at least in part, on the city or town within which the vehicle 12 is traveling. If, for instance, the vehicle 12 is traveling outside the vehicle driver's home town, then information pertaining to points of interest for hotels may be displayed. This is in contrast to when the vehicle 12 is traveling within a predefined distance from the garage address of the vehicle 12, where information pertaining to hotels may not be desirable. If the information pertaining to hotels inside the vehicle driver's home town is desirable, the vehicle driver may, e.g., change his/her preference settings.

In an example, restriction on the amount and/or type of information may also be determined from a key of the vehicle 12 having a sensor connected therewith (such as a keyfob). This key, when used, e.g., to power on the vehicle 12 may establish a short range wireless connection with the telematics unit 14, and communicate an identification of the vehicle driver. Using this identification information, the telematics unit 14 will look up the user profile stored in the memory 38 thereof to obtain any restrictions on the type and/or amount of information to be displayed for that particular vehicle driver. In this example, the restrictions, if any, may be implemented by the telematics unit 14, e.g., the telematics unit 14 may alter the display settings (e.g., aspect ratio, resolution, color settings, etc.).

In an example, the identification information of the user (e.g., the vehicle driver) obtained from the keyfob may be transmitted to the call center 24 having the user profile, and restrictions from the user profile may be transmitted back to the telematics unit 14 from the call center via, e.g., the communications module 86. The telematics unit 14 may then implement the restrictions received from the transmission.

In another example, the restriction on the amount and/or type of information may be determined from the vehicle driver's mobile communications device 98, which may communicate an identification of the vehicle driver to the telematics unit 14 upon establishing a short range wireless connection with the telematics unit 14. The short range wireless connection may be established, for example, by establishing a BLUETOOTH® connection or a WiFi™ connection. The identification information may be used, by the telematics unit 14, to obtain any restrictions on the amount and/or type of information to be displayed to the vehicle 12.

Yet further, restriction on the amount and/or type of information to be displayed may be based, at least in part, on certain constraints of the offboard server 110, such as the server's 110 information transmission capacity and/or communications capabilities.

Figure 5:
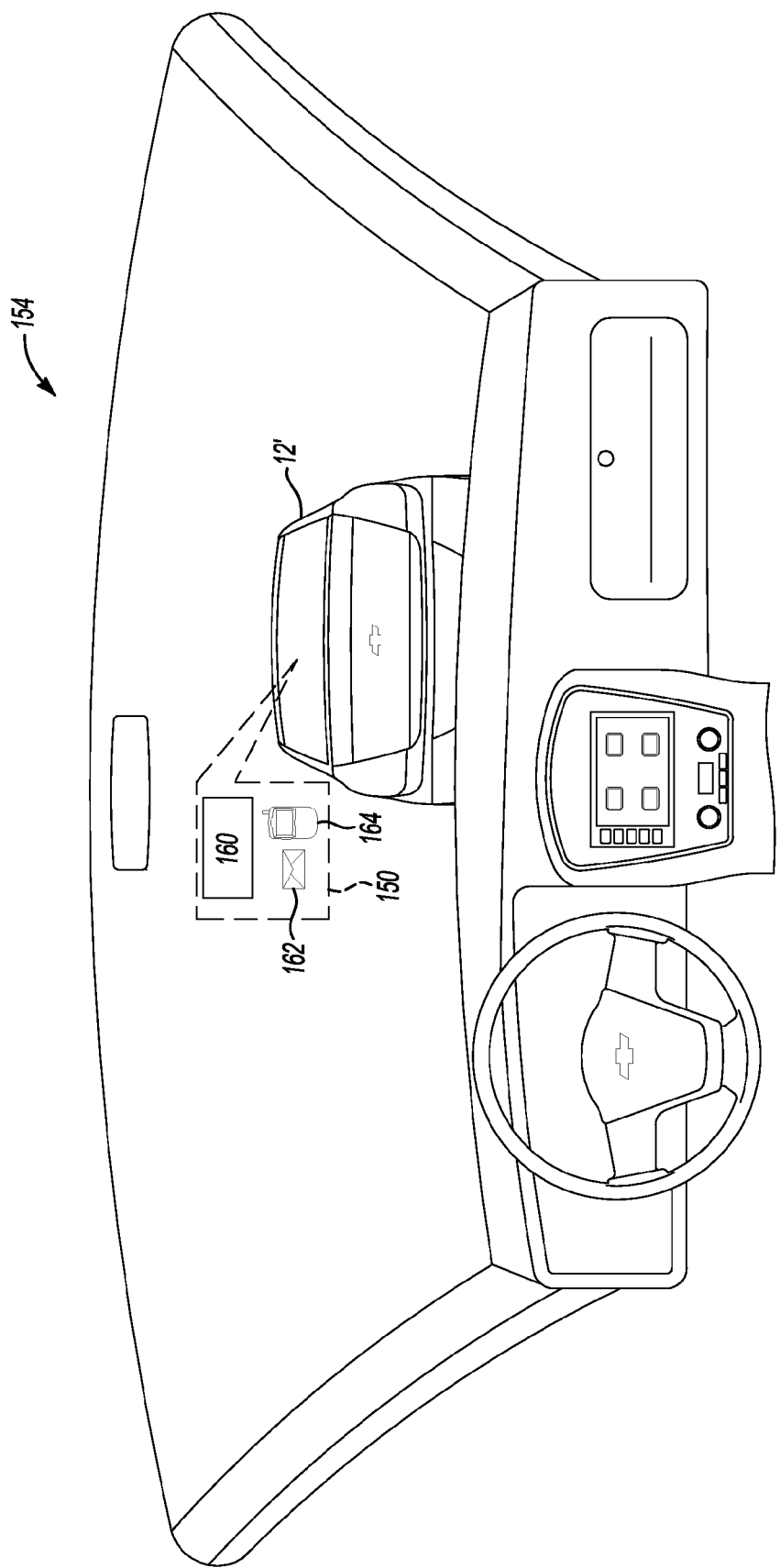
FIG. 5 semi-schematically depicts a vehicle interior where information associated with an entity is displayed to a vehicle occupant according to one example of the present disclosure.
Figure 6:
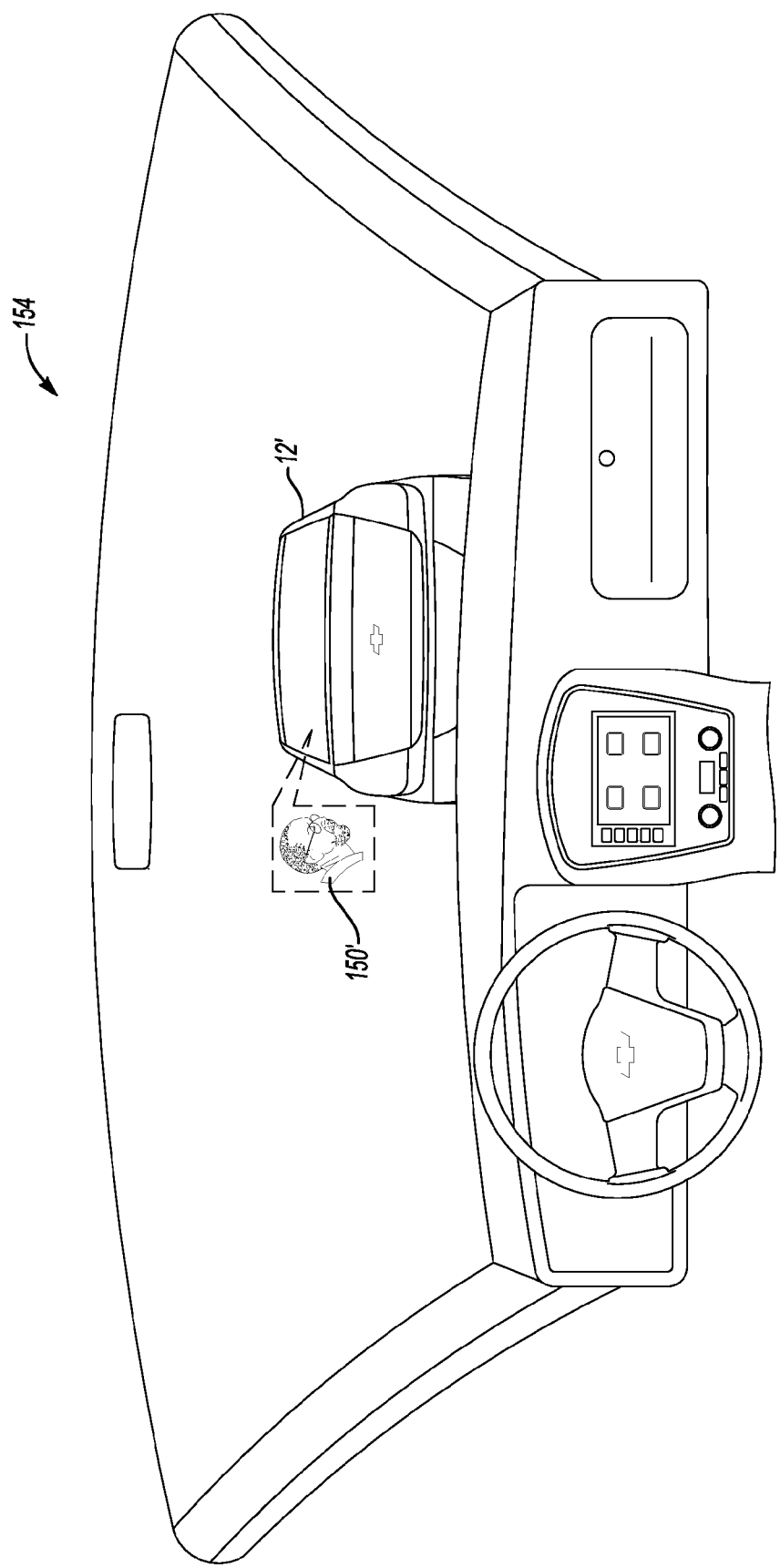
FIG. 6 semi-schematically depicts a vehicle interior where information associated with an entity is displayed to the vehicle occupant according to another example of the present disclosure.

Some examples of how the information may be displayed will now be described in conjunction with FIGS. 5 and 6. In one example, the information may be presented visually (via a visual modality), an example of which includes a text-based message. An example of a text-based message may include the first and last name of a particular person (e.g., J. Smith) whose vehicle is within the field of view of the vehicle 12 driver while driving. This example is shown in FIG. 5, where the overlay 150 includes the first and last name (J. Smith) represented by the box labeled with reference numeral 160. FIG. 5 also depicts graphics (shown as 162 and 164) in the overlay, which will be discussed further hereinbelow.

Figure 8B:
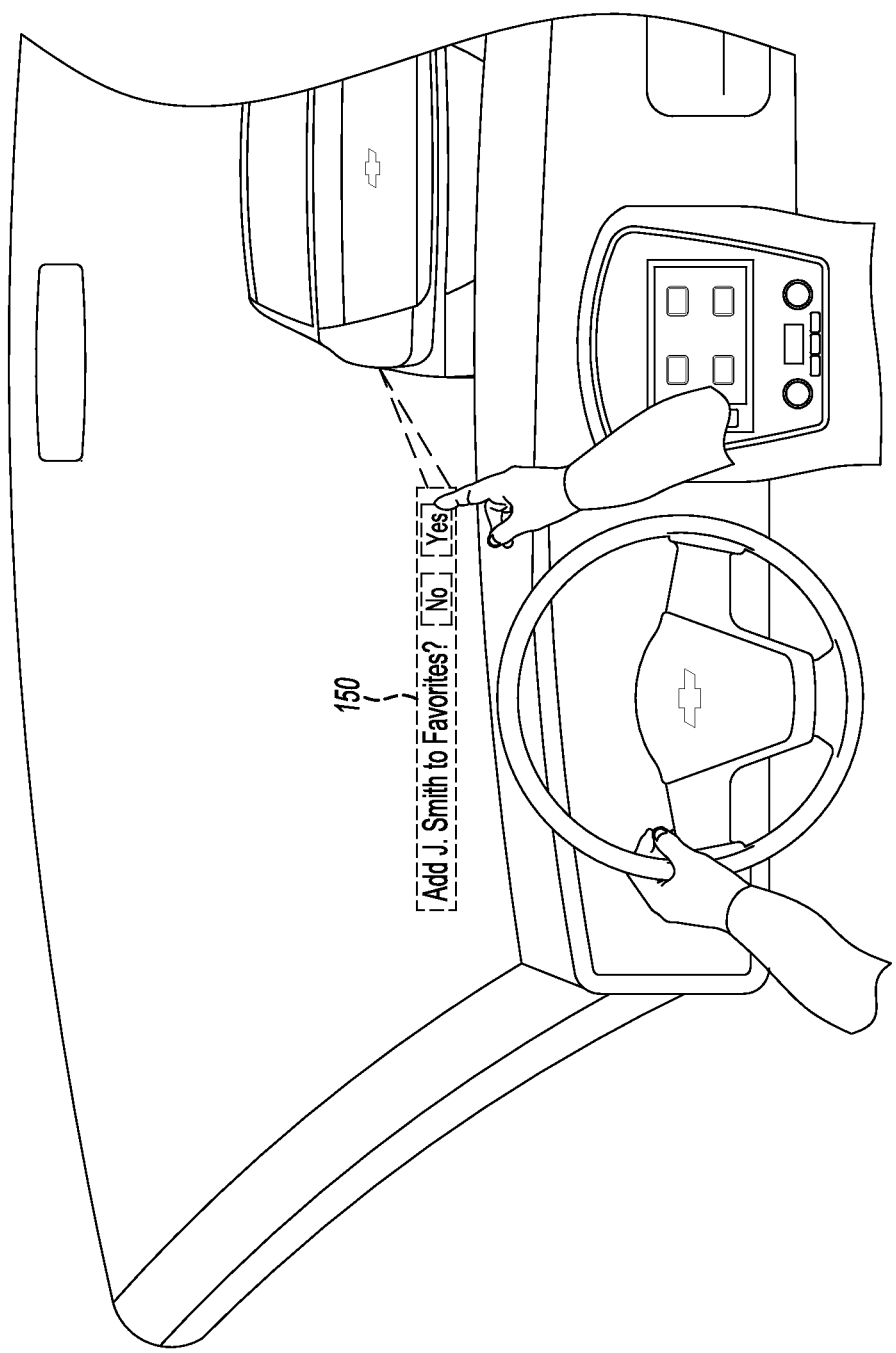
FIG. 8B semi-schematically depicts the example of the portion of the vehicle interior of FIG. 8A with a vehicle occupant physically selecting (via the vehicle occupant's hand) an actionable item in space.

As shown in FIG. 5, the first and last name of the person (i.e., box 160) may be displayed as an augmented overlay 150 to the left of the object representing J. Smith (in this example, J. Smith's vehicle 12'). The overlay 150 may, in another example, be placed directly over (or on) the vehicle 12', above the vehicle 12', to the right of the vehicle 12', or below the vehicle 12'. It is to be understood that, in some examples, the overlay 150 is placed at a location that is within the field of view of the vehicle occupant (e.g., driver), but not within the path of the roadway and/or expected oncoming obstacles in the roadway. For instance, the overlay 150 may be placed somewhere along the periphery of the windshield, such as at the bottom of the windshield (an example of which is shown in FIGS. 8A and 8B). Other locations along the periphery of the windshield include, for example, at the top of the windshield, at the left side of the windshield, at the right side of the windshield, or the like.

The placement of the overlay 150 may, in an example, be selected by the user as a preference. In another example (not shown in FIG. 5), the text-based overlay may be the name "McDonald's" presented as a visual overlay above a MCDONALD'S® establishment that is also within the field of view of the vehicle driver. In yet another example (also not shown in FIG. 5), the text-based message may be the name "Statue of Liberty" that is presented as a visual overlay to the left of the Statue of Liberty when the landmark is within the field of view of the vehicle driver.

It is to be understood that the presentation of the information in the overlay 150 may be dictated, e.g., by the source from which the information (i.e., the content) was retrieved. For instance, if the information was extracted from the user's personal webpage 94 hosted by TWITTER®, the presentation of the information may be constrained to the size of a tweet (e.g., 140 characters).

In another example, the information may be presented visually as a graphic-based message, such as a picture, drawing, photographic, or the like that represents the entity. This is shown in FIG. 6. For instance, a photograph of J. Smith may be displayed, as the augmented overlay 150', next to J. Smith's vehicle 12' that is then-currently within the field of view of the vehicle driver. In another example, the graphic-based message may also be a drawing or figure that represents the entity and is created or selected by the user. The drawing or figure (e.g., a smiley face, a heart, a peace symbol, a cartoon character, an animal, etc.) may be presented as an overlay on or next to J. Smith's vehicle 12' when the vehicle 12' is within the field of view of the vehicle driver.

In an example, the augmented visual overlay 150, 150' may be created using augmented reality, where physical real world elements (e.g., the object representing an entity as previously described) are augmented using the overlay 150, 150'. The augmented overlay 150, 150' is essentially a computer-generated sensory input that may be displayed on and/or adjacent to the real world element (in this case, the object), and may be produced using a set of spatial displays. In an example, the augmented overlay 150, 150' may be realized using digital light projectors to form two-dimensional/three-dimensional imagery onto the real world element. The digital light projectors (identified by reference numeral 130 in FIG. 1) are connected to the vehicle bus 34, and are thus in operative and selective communication with the telematics unit 14 and the processor 36. Further the digital light projectors 130 are positioned inside the vehicle interior 154 so that the projectors 130 can produce the augmented overlay 150, 150' through any window that is within the field of view of the vehicle driver, such as the windshield of the vehicle 12.

In an example, the processor 36 sends a two-dimensional rendering of the overlay 150, 150' to be displayed from a preset reference location determined on an xyz coordinate frame of reference. To present the overlay 150, 150' on three-dimensional reality, via the processor 36, both the eye positioning of the vehicle driver and the concavity of the vehicle windshield is taken into account to properly adjust the two-dimensional rendering of the overlay 150, 150'. The adjusted two-dimensional rendering of the overlay 150, 150' is then used to augment the three-dimensional reality as seen by the vehicle driver through the windshield of the vehicle 12.

The eye positioning of the vehicle driver may be obtained, for example, by tracking the vehicle driver's eyes while driving, and then updating the overlay 150, 150' in real time based on the tracking. It is believed that this method may reliably determine the positioning of the vehicle driver in real time since the driver may lean, shift, or otherwise move in his/her seat while driving, and thus the driver's viewing angle (based on his/her eye positioning) may constantly change.

Figure 7:
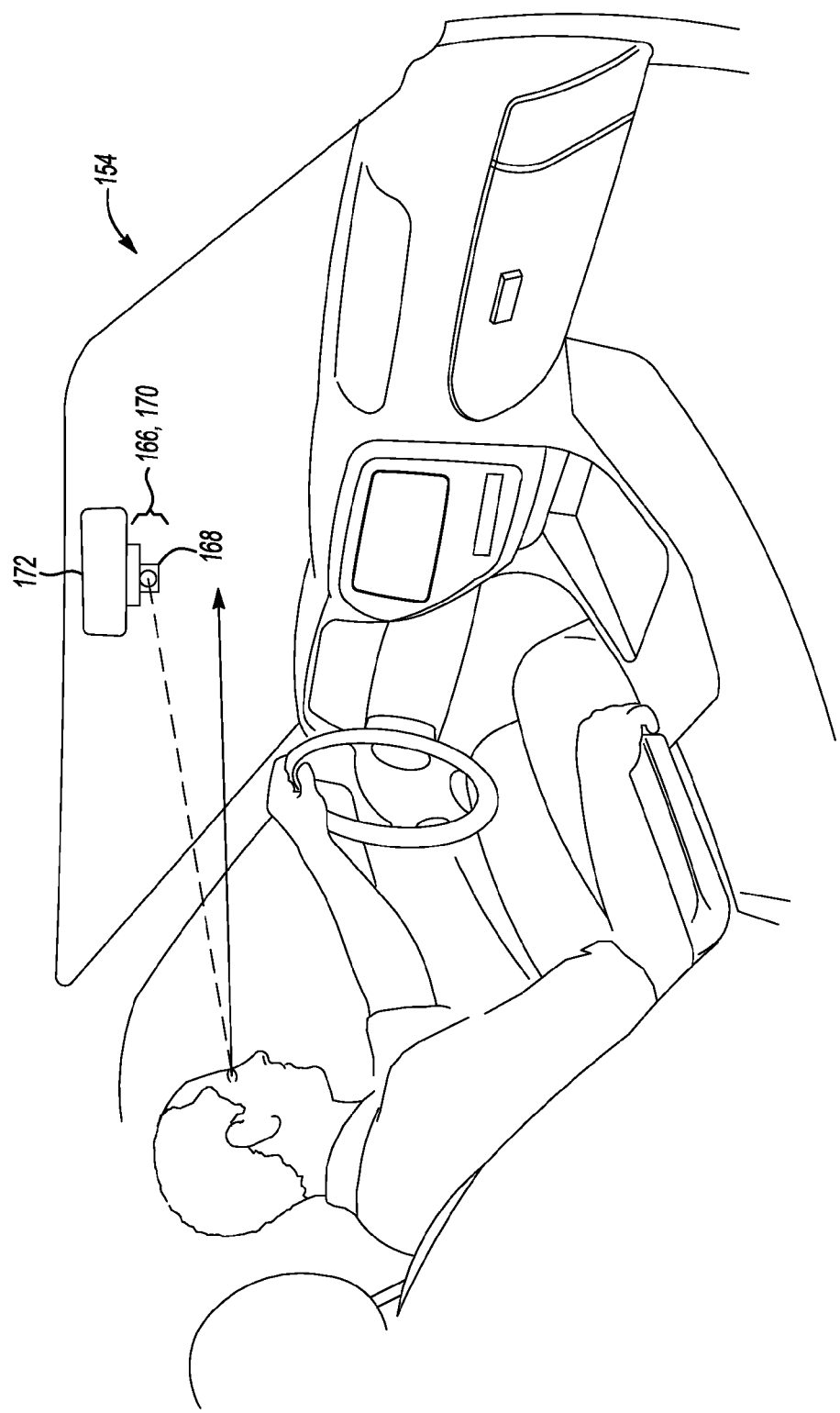
FIG. 7 semi-schematically depicts an example of a vehicle interior and a vehicle driver with his eyes focused toward the front of the vehicle.

In an example, the vehicle driver's eyes may be tracked utilizing a tracking device 166, which is operatively disposed inside the vehicle interior 154, as shown in FIG. 7. In an example, the tracking device 166 is an eye-tracking device that is configured to monitor an eye position of the vehicle driver while the vehicle 12 is in operation. For instance, the eye-tracking device 166 may be used to measure the driver's eye position (e.g., the point of gaze) and the movement of the driver's eyes (e.g., the motion of the eyes relative to the driver's head). This may be accomplished by utilizing a facial imaging camera 168, which may be placed inside the vehicle interior 154 in any position that is in front of (either directly or peripherally) the vehicle driver. Examples positions for the facial imaging camera 168 include on the rearview mirror 172 (as shown in FIG. 7), on the dashboard, on the mounting stem of the steering wheel, or the like. This camera 168 is configured to take images or video of the vehicle driver's face while driving, and the tracking device 166 is further configured to extract the driver's eye position from the images/video. In another example, the movement of the driver's eyes is determined by light (such as infrared light) reflected from the cornea of the eye, which is sensed by a suitable electronic device (which can be part of the tracking device 166) or an optical sensor (not shown in FIG. 1). The information pertaining to the eye motion may then be utilized (e.g., by a processor 170, shown in FIGS. 1 and 7, associated with the eye tracking device 166) to determine the rotation of the driver's eyes based on changes in the reflected light.

The processor 170 associated with the eye-tracking device 166 executes computer program code encoded on a computer readable medium which directs the eye-tracking device 166 to monitor the eye position of the vehicle driver while he/she is driving. Upon determining that the driver's eye position has changed, the eye-tracking device 166, via the processor 170, is configured to determine the direction at which the driver's eyes are now focused.

It is to be understood that the eye-tracking device 166 continues to monitor the eye position of the driver's eyes so that the eye-tracking device 166 can determine when the driver's eyes are positioned in a particular direction to determine the driver's viewing angle. When this occurs, the eye-tracking device 166 is further configured to send another signal to, for example, the telematics unit 14 with information reflecting the driver's face angle based on the positioning of his/her eyes.

In another example, the tracking device 166 may be a facial imaging device. This device also uses an imaging or video camera (such as the camera 168 shown in FIG. 7) to take images/video of the driver's face while he/she is operating the vehicle 12. The processor 170 associated with the facial imaging device 166 uses the images/video to determine that the driver's then-current line-of-sight based, at least in part, on the facial position of the driver. The facial position may be determined, for example, by detecting the angle at which the driver's head is positioned in vertical and horizontal directions. Similar to the eye-tracking device described above, the facial imaging device also has a processor 170 associated therewith that executes an application/computer readable code. The application commands the device 166 to monitor the facial position of the vehicle driver while the vehicle is in operation.

Another way of determining the vehicle driver's face angle is to use a profile key, where such key is associated with a particular user. The key may be stored in the user profile, and may include physical information of the user, such as the user's height, weight, age, etc. The eye position of the user may be determined from this information, as well as other vehicle interior information (such as seat weight and seat position) to obtain an xyz reference location of the user.

In an example, the information is automatically displayed to the vehicle 12 as soon as the object is within the field of view of the vehicle driver. In another example, the information may be displayed in response to a user inquiry. For instance, the vehicle driver may ask the telematics unit 14 (e.g., by reciting the question into the microphone 28) if, e.g., J. Smith is around. This inquiry is transmitted to the offboard server 110 which will respond accordingly. If J. Smith is present by the time the inquiry is processed (i.e., J. Smith is within the field of view), then the information pertaining to J. Smith will be displayed to the vehicle 12. If, e.g., the vehicle 12 passed J. Smith's vehicle 12' once the inquiry was processed, an image may appear notifying the driver that the vehicle 12 already passed J. Smith's vehicle 12', and may also provide then-current location information of J. Smith's vehicle 12' so that the vehicle driver can find him.

Referring back to FIG. 5, in an example, the overlay 150 may include at least one actionable item associated with the information (e.g., J. Smith's name 160) that is selectable by the user. As shown in FIG. 5, the overlay 150 includes two actionable items; an option to send a text message to the entity represented by the object that is within the field of view of the vehicle driver (in this case, J. Smith who is represented by the vehicle 12') and an option to initiate a phone call to the entity represented by the object that is within the field of view of the vehicle driver. The option to send a text message may be represented, e.g., by an icon 162, such as an envelope, whereas the option to initiate a phone call may be represented, e.g., by another icon 164, such as a cellular phone. It is to be understood that the representations of the options may be different than those shown in FIG. 5.

If, for instance, the user wants to send a text message to the entity (e.g., J. Smith), then the user may select the envelope 162 by pressing the option on a touch screen (such as the display 80), activating an appropriate button associated with the vehicle 12, or selecting the option 162 by reciting the selection into the microphone 28. For any of these methods, upon receiving the command, the telematics unit 14 asks the user to recite utterances into the microphone 28, and utilizes speech-to-text software to convert the utterances into text for the text message. The text message may be sent directly from the telematics unit 14 to, e.g., J. Smith's cellular phone.

While not shown, the overlay 150 may also or otherwise include an icon to upload a post to one or more of the user's social networking webpages (e.g., webpage 94). When this icon is selected, the user may input the post message using the technique described above for sending a text message.

In instances where the user wants to call J. Smith (i.e., the entity represented by the vehicle 12'), then the user may select the cellular phone icon 164 presented in the overlay 150 using any of the same methods described above for sending a text message. However, in this example, upon selecting the cellular phone icon 164, the telematics unit 14 automatically dials the mobile dialing number of J. Smith's cellular phone, which may have been transmitted from the offboard server 110 with J. Smith's information or retrieved from the user's contact list stored in the memory 38. The user can then talk to J. Smith once a connection is established in a hands free mode through the telematics unit 14.

As shown in FIGS. 8A and 8B, in another example, the user may select an actionable item by making a gesture that is recognizable by, e.g., a sensor 132 (shown in FIG. 1) that is programmed to recognize the gesture and translate the gesture into a command. In an example, the sensor 132 is a camera generally positioned so that it faces the vehicle driver so that it can capture the movements or gestures of the vehicle driver. In another example, the sensor 132 is a capacitive sensor that may take the form of a gesture-based touchscreen and has a sensing range that can reach the vehicle driver's movements/gestures. Recognition of the vehicle driver's gestures may be accomplished utilizing manufacturer settings for recognizing basic gestures. These manufacturer settings may be altered by training the sensor 132, e.g., by running the sensor 132 through several gestures of the vehicle driver to capture those gestures as being unique to the driver.

As shown in FIG. 8A, the overlay 150 is a question regarding whether or not to add J. Smith to a favorites list of the user's contacts, and two actionable items—yes and no. In response to the question, the user may select one of the actionable items, and upon making the selection, the processor 36 of the telematics unit 14 performs the action selected by the user or alternatively the processor 36 transmits a command that is sent to the source content to perform the action. As shown in FIG. 8B, the user uses a gesture; specifically a physical motion performed by, e.g. the vehicle driver to select one of the actionable items. In FIG. 8B, the user points his/her index finger toward the yes option of the overlay 150, indicating that the user does want to add J. Smith to the favorites list. The sensor 132 picks up the gesture when the gesture is being performed, and recognizes the gesture as a command to perform a particular function. Then, upon recognizing the gesture as a command to perform the function, a processor (not shown) associated with the sensor 132 automatically sends a signal to the telematics unit 14 indicating the same.

It is to be understood that the gesture may be performed using other motions. For example, the user may use a thumbs up gesture or a thumbs down gesture to indicate his/her actionable item selection. In other examples, the gesture is not necessarily performed via the driver's hands. One example of another recognizable gesture includes a facial expression, such as smile or vertical head nod to select yes, or a frown or horizontal head shake to select no.

Figure 9:
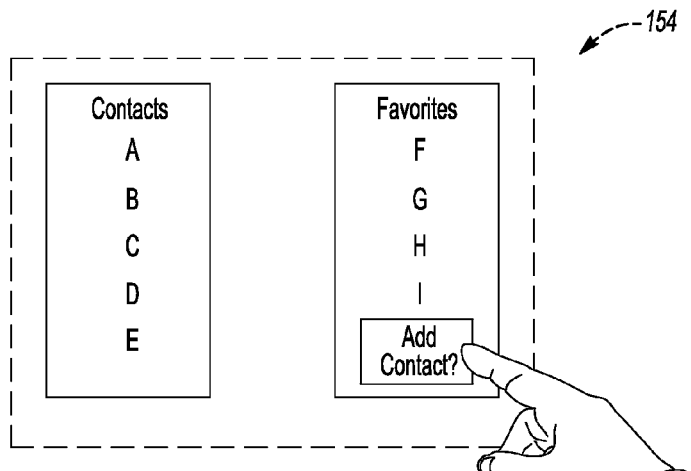
FIG. 9 semi-schematically depicts an example of an overlay where a vehicle occupant has an option to add new information via a gesture.

Gestures may also be used, by the user, to dynamically order information. Dynamically ordering information includes, e.g., organizing new information, re-organizing existing information, and/or deleting existing information. The dynamic ordering of information, however, is generally accomplished when the vehicle 12 has been presented with an augmented image displayed on and/or adjacent to a vehicle of a particular entity (such as the vehicle 12' of J. Smith). In an example, the user does not have J. Smith's information in his/her contact list, and may therefore want to add him as a new contact to his/her contact list. An example of organizing new information will be described herein in conjunction with FIG. 9. FIG. 9 shows a portion of the vehicle interior 154 where an augmented image is displayed to the vehicle occupant(s) that contains a portion of the user's contact list. In this overlay, a portion of the user's favorites list is also displayed to the vehicle occupant(s). New information may be added to the user's favorites list, e.g., by the vehicle driver by making a gesture that is recognizable by the sensor 132. The gesture may include a single gesture or a plurality of gestures to perform the activity of adding the new information (in this case, J. Smith) to the favorites list. In an example, the vehicle driver may use his/her finger to select an actionable item of the overlay (e.g., an icon that reads "Add Contact?", as shown in FIG. 9), and this gesture is picked up by the sensor 132. The actionable item may be presented by itself as an icon on the overlay 150 so that the vehicle driver can select the icon using a single gesture, or the icon may be found in a menu of options that may require two or more gestures by the vehicle driver to select the icon. In any event, once the vehicle driver has selected to add the new information (e.g., the new contact), the vehicle driver may recite the new information into the microphone 28, and the recited information may be stored in the contact list, or the telematics unit 14 transmits a command to an appropriate onboard or offboard component (e.g., address book on the mobile device 98) to save the information as a new contact.

Figure 10:
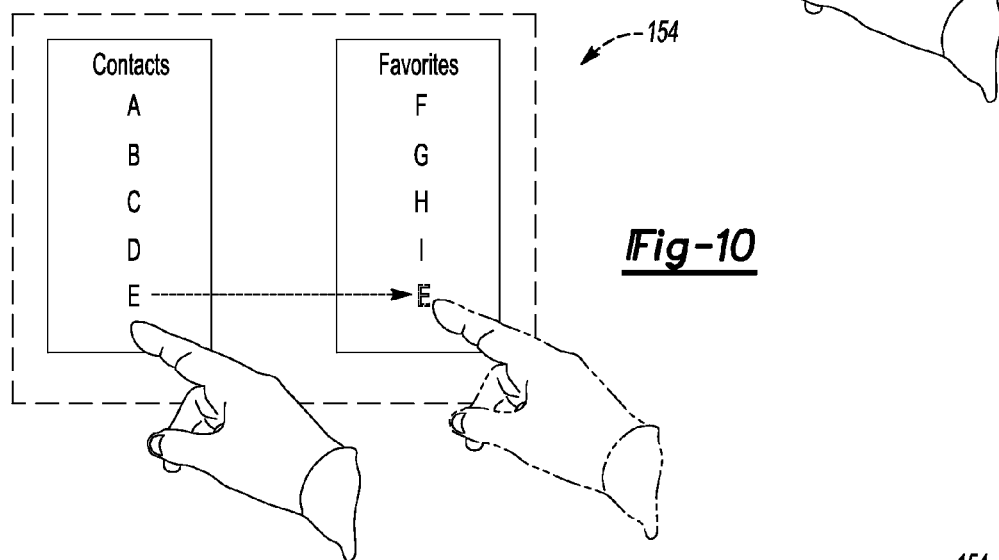
FIG. 10 semi-schematically depicts an example of an overlay where a vehicle occupant has an option to reorganize information via a gesture.

In another example, the vehicle driver may already have J. Smith in his/her contact list. In this case, the vehicle driver may be presented with a question of whether or not he/she would like to move J. Smith (e.g., E shown in FIG. 10) to another portion of the contact list, such as, e.g., to the favorites list. If the vehicle driver wishes to do so, he/she may make a gesture with his/her hand to select an icon representing J. Smith from the contact list and drag the icon into the favorites list. This is shown in FIG. 10 in dotted lines where the hand "drags" the icon from one list to the other.

Figure 11:
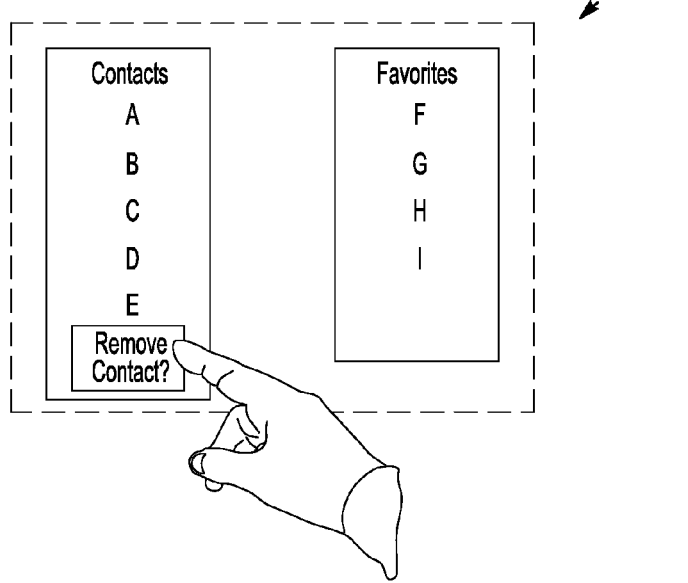
FIG. 11 semi-schematically depicts an example of an overlay where a vehicle occupant has an option to remove information via a gesture.

In still another example, J. Smith may already be in the vehicle driver's contact list, but the vehicle driver may wish to remove the contact from his/her contact list. As shown in FIG. 11, the vehicle driver may make a gesture, e.g., by pointing his/her finger at an icon for removing a contact. Upon selecting the icon, the vehicle driver may recite, into the microphone 28, the name of the contact to be removed, or may make another gesture to select the contact that he/she wants to remove from the contact list. In response, the telematics unit 14 transmits a command to an appropriate onboard or offboard component (e.g., address book on the mobile device 98) to delete the information.

It is to be understood that the actionable items described above in reference to FIGS. 8A, 8B and 9-11 are considered to be examples of haptic modalities. As illustrated, haptic modalities include a visual modality.

Figure 12:
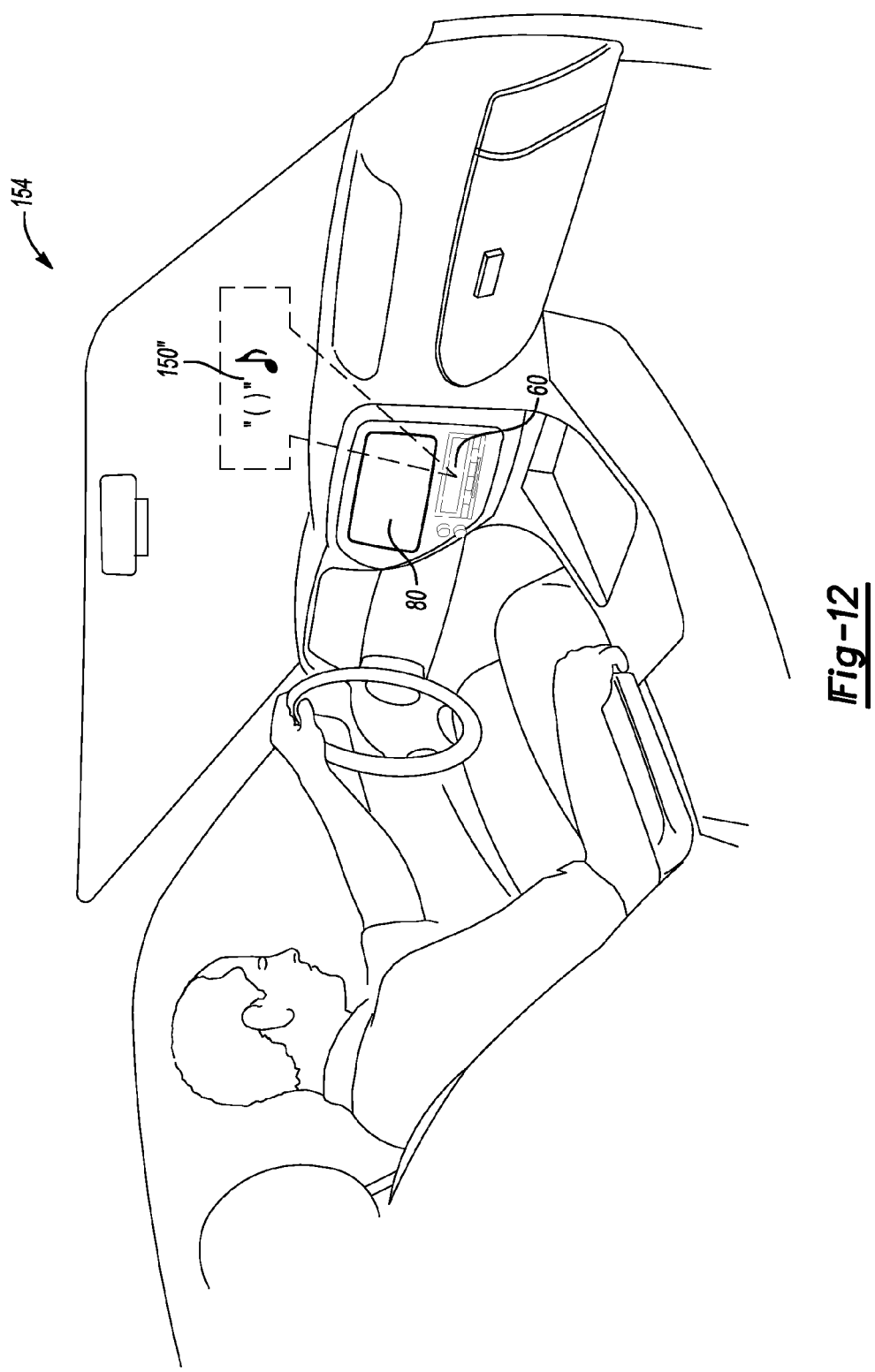
FIG. 12 semi-schematically depicts a vehicle interior where information associated with an entity is displayed to the vehicle occupant according to yet another example of the present disclosure.

In an example of the method, an aural modality is selected for displaying the information pertaining to the entity to the vehicle 12. In this example, when the object representing the entity is within the field of view of the vehicle driver, the telematics unit 14 sends a signal to the audio component 60 to play an audible message inside the vehicle 12. In an example, the audible message includes all of the information that would otherwise be displayed in text and/or graphic form if an augmented image were displayed instead. This example is shown in FIG. 12, where the audible message 150" is shown in quotations. In another example, the audio component 60 is configured to play a tone or a musical work instead of, or in addition to the audible message. The tone and/or musical work may have been previously selected by the user, e.g., via the webpage 122, and the tone and/or musical work may be used to represent the entity.

It is to be understood that the examples of the method described above may be modified to display content for a plurality of vehicle occupants at the same time. For instance, specific content may be displayed for the vehicle driver when an object representing an entity is within the vehicle driver's field of view, while other specific content may be displayed for a back seat passenger when an object representing an entity is within the back seat passenger's field of view. Modification of the method to cover this example will now be described herein.

It is to be understood that to perform the instant example of the method, the user (e.g., the subscriber who may also be the vehicle owner) may designate one or more other persons who may, at some point, become a driver of or a passenger in the vehicle 12. The person(s) may be designated, by the user, when the user sets up his/her account with the telematics service provider, or may be designated at a later time, such as when the user account is updated. In an example, the user may create a file for each designated person, and this file is stored in the user profile at the call center 24. It is to be understood that a file may be created for any number of potential drivers of and/or passengers in the vehicle 12, such as the significant other and/or child(ren) of the vehicle owner (who, e.g., is the subscriber). In this example, the user profile may then contain separate files for each of the vehicle owner, the vehicle owner's significant other and any child(ren), and the instant example of the method may be applied for each of these designated persons. It is to be understood that the instant example of the method is not applied for undesignated drivers/passengers. It is further to be understood that the subscriber (e.g., the vehicle owner) or other authorized user may add or delete passenger files to/from the user profile at any time.

Each file created and stored in the user profile may contain a name of the designated person, and information that may be used, by the offboard server 110 (via, e.g., the processor 112 running software code), to identify the designated person when he/she is a driver of, or a passenger in, the vehicle 12. An example of information that may be used to identify a passenger includes the passenger's mobile communications device (e.g., his/her cellular phone), such as the serial number of the device and its mobile dialing number (MDN) or a short range wireless security codes/name (also referred to as a BLUETOOTH® name). In an example, the designated person may be identified as a driver of, or a passenger in, the vehicle 12 when the designated person's mobile device is paired with and connected to the telematics unit 14 via, e.g., a BLUETOOTH® connection. The offboard server 110 can retrieve, from the telematics unit 14, the wireless connection key or mobile dialing number of the device that is connected to the telematics unit 14, and compare such information with that stored in the user profile to identify the vehicle driver/passenger. The offboard server 110 will determine that the driver/passenger is a designated person if the wireless connection key or mobile dialing number matches that/those stored in the user profile.

It is to be understood that the offboard server 110 may employ other methods of identifying vehicle drivers/passengers, and examples of those methods will be described in detail below.

Referring back to the creation of the individual files of the potential vehicle drivers/passengers, in an example, the designated person(s) may select content associated with an entity, and a source from which information pertaining to the content is retrievable. The selections may be made by the user on behalf of the designated persons, or may be selected by the designated persons themselves so long as he/she/they have authorization to do so by the user. Further, the content and the content source may be selected, by the user or by the designated person(s), via any of the methods previously described in conjunction with step 200 of FIG. 2, and such information may be stored in respective files of the designated persons. In some cases, the designated persons may also select preferences associated with the entities, the content retrieval method, the display of the content, and/or the like, and the preferences are also stored in the respective files of the designated persons. The information contained in each of the designated person's files are accessible by the offboard server 110 during any of the examples of the method described at least in conjunction with FIG. 2, at least in part because the information is part of the user profile.

After the potential vehicle drivers/passengers have been designated, and the respective files have been created and stored in the user profile, the example method includes identifying any persons that are then-currently inside the vehicle 12. As previously mentioned, one way of identifying one or more persons in the vehicle 12 includes comparing identification information of the persons' mobile communications device(s) when such device(s) establish respective short range wireless connections with the telematics unit 14. Persons inside the vehicle 12 may also be identified via spatial recognition of a person's physical features, such as the shape, color, and features of the person's face. In an example, a separate facial imaging camera 168 may be positioned inside the vehicle 12 for each passenger seat, and the camera 168 may be used to take images or video of the person that is then-currently occupying a particular passenger seat. In some cases, the camera 168 may have been trained to recognize the persons, while in other cases, the images/video taken by the camera 168 are transmitted to the offboard server 110 which compares the images/video to other images previously stored in the user profile to make the identification. In yet other cases, the offboard server 110 (via software run by the processor 112) may compare the images/video to previously tagged photographs or other pictures (via, e.g., recognition software run by the networking website) posted on the subscriber's webpage 96, such as his/her Facebook™ page.

Yet another way of identifying person(s) in the vehicle 12 includes verbally reciting utterances into the microphone 28 that is operatively connected to the telematics unit 14, where such utterances include information identifying who is physically present inside the vehicle 12. The verbal utterance(s) may include the name of each person that is then-currently inside the vehicle 12 and in which passenger seat each person is sitting. The verbal utterance(s) is/are thereafter forwarded from the telematics unit 14 to the offboard server 110.

Once the vehicle driver/passenger(s) has/have been identified via any of the methods described immediately above, steps 202 through 206 of FIG. 2 are applied as described above. Before step 208, however, the offboard server 110 will determine the relative positioning of any objects representing entities that are within proximity to the vehicle 12 determined during step 206. For instance, if three entities are identified by the offboard server 110, then the offboard server 110 will determine where each of the three entities is positioned relative to the vehicle 12 (e.g., the first entity may be positioned in front of the vehicle 12, the second entity may be positioned to the left of the vehicle 12, and the third entity may be positioned at the rear of the vehicle 12). This determination may be made, e.g., utilizing GPS coordinate information of the objects representing the entities to determine the relative positioning of the objects with respect to the vehicle 12. The determination may also be made utilizing cell tower triangulation or other positioning methods.

The offboard server 110 will then determine which of the entities are within the field of view of the respective passengers inside the vehicle 12. For example, if three passengers are inside the vehicle 12 (i.e., the vehicle driver, a passenger in the front passenger seat, and a passenger seated in the backseat on the left side), the offboard server 110 may determine that the first entity (that is positioned in front of the vehicle 12) is within the field of view of all three passengers. It may also be determined that the second entity (that is positioned to the left of the vehicle 12) is within the field of view of both the vehicle driver and the back seat passenger (e.g., through the left side window(s) of the vehicle 12), but not within the field of view of the front seat passenger.

The offboard server 110 makes the determination about which objects are within the field of view of each of the vehicle occupants and where to display the overlay using the location and orientation of vehicle 12 and the location (and in some instances the orientation) of the object representing the entity. In these instances, a calculation of line of sight may be made. In other instances, the determination about which objects are within the field of view of each of the vehicle occupants and where to display the overlay may be made using GPS information of the object representing the entity, the GPS eyelipse of the particular occupant, and vehicle window and pillar information. The GPS information of the object may include x, y and z coordinates, where z is the height of the entity. The GPS eyelipse of the user may also include x, y and z coordinates. The offboard server 110 has access to information that is stored about the various occupants (e.g., from the driver's profile), and this information includes the H-point or Hip-point to eye location. As such, the server 110 knows approximately where a particular occupant's eye would be located, taking into account some error based upon slouching, head turning, etc. The server's information about the location of the occupant's eye could be improved by receiving information from the in-vehicle cameras previously described herein. The offboard server 110 also knows the vehicle 12 and its dimensions (e.g., B-pillar is located from <x1,y1,z1> to <x2,y2,z2>). Utilizing all of this information, the offboard server 110 can identify what entities would fall within a particular occupant's visible area (i.e., field of view). It is to be understood that sensor(s) 64 within the vehicle 12 may inform the offboard server 110 if the visible areas of the vehicle 12 have changed based upon passenger settings (e.g., if a convertible top is up or down).

As previously stated, at step 208, the offboard server 110 obtains the information pertaining to the entity/ies that are within proximity to the vehicle 12. However, for the instant example, the offboard server 110 will retrieve the selected content source(s) from, e.g., the file of the user profile corresponding with a person inside the vehicle 12 whose field of view contains an object representing the entity. This is done for each person inside the vehicle 12 having an entity falling within his/her field of view. Then, the offboard server 110 will retrieve content pertaining to an entity from the selected content source(s) for each person inside the vehicle 12. Referring back to the example above, since the second entity is within the field of view of the vehicle driver and the back seat passenger, and files for each of these persons is available in the user profile, the offboard server 110 will refer to the vehicle driver's selected content source and the back seat passenger's selected content source to retrieve pertinent information of the second entity. If, for instance, an entity is only within the field of view of the front seat passenger (e.g., through the right side window of the vehicle 12), then only the front seat passenger's file is accessed by the offboard server 110 to obtain the front seat passenger's selected content source. The information retrieved from the content source(s) is then transmitted to the telematics unit 14 of the vehicle 12 at step 210.

Upon receiving the information, the telematics unit 14 sends a command to an appropriate vehicle system to display the information, and the information is displayed at step 212 of FIG. 2. The telematics unit 14 (via the processor 36 running computer readable code) determines where the information should be displayed before sending the command to display the information. For example, the information pertaining to the entity that is within the field of view of the back seat passenger may be displayed by producing an augmented overlay through the back window on the left hand side of the vehicle 12 (which may have a unique identifier) so that the overlay is produced next to or on the object representing the entity and is perceivable by the back seat passenger. The information pertaining to the entity that is within the field of view of the vehicle driver, on the other hand, may be displayed by producing an augmented overlay through the front windshield (which has its own unique identifier) so that the overlay is produced next to or on the object representing the entity and is perceivable by the vehicle driver.

In an example, the command(s) to display the information that is/are sent to the appropriate vehicle system(s) from the telematics unit 14 may include i) the unique identifier of the window of the vehicle through which the overlay will be produced (e.g., the front windshield) and ii) the information to be displayed (e.g., information for the vehicle driver). At the same time, another command may be sent to the appropriate vehicle system(s) that includes the unique identifier of another window of the vehicle, and the information to be displayed as an overlay through that window (e.g., information for the back seat passenger).

In instances where an entity falls within the field of view of more than one person or occupant in the vehicle 12 (e.g., the entity can be seen through the front windshield and can be perceived by the vehicle driver and the front seat passenger), the information displayed may include information retrieved from the content sources selected by all of those persons. The command to display the information sent by the telematics unit 14 may, in this case, include instructions to display all of the information obtained from, e.g., the selected content sources of the vehicle driver and the front seat passenger. In some instances, the telematics unit 14, via the processor 36, may apply a filtering program to remove duplicate information (e.g., two of the same name, two of the same phone number, etc. for a single entity). However, if different information is obtained from the respective content sources, all of the information may be displayed. In one example, the information retrieved from the vehicle driver's content source(s) may be displayed in one color, while the information retrieved from the front seat passenger(s) content source(s) may be displayed in another color. In another example, the information for the vehicle driver may be displayed to the left of the entity, while the information for the front seat passenger may be displayed to the right of the entity. In these ways, preferences selected by the vehicle driver and the front seat passenger may be applied to their respective overlays.

It is to be understood that the same process may be applied when an audible message is produced as the augmented overlay. In this case, the information may, in an example, be displayed to one vehicle occupant by playing an audible message (containing the information) over a speaker 30, 30' positioned adjacent to that vehicle occupant, and another audible message may be played to another vehicle occupant over a different speaker 30, 30' that is positioned adjacent to that other vehicle occupant. For instance, an audible message may be played to the vehicle driver over left side, front speaker(s) 30, 30', while another audible message may be played to the back seat passenger over the left side, back speaker(s) 30, 30'. In another example, a single message may be played to the vehicle occupants through all of the speakers 30, 30', but such message may be separated into different parts, each specific for a single vehicle occupant. For instance, one part may identify the vehicle driver and then provide the information to him/her, and another part may identify the back seat passenger and then provide other information to him/her.

As mentioned above, the augmented overlay may be displayed to the passenger(s) alone. In this example, the vehicle driver/passenger(s) has/have been identified via any of the methods described above, and then steps 202 through 206 of FIG. 2 are applied as described above. Before step 208, the offboard server 110 will determine the relative positioning of any objects representing entities that are within proximity to the vehicle 12 determined during step 206, and will also determine which of the entities are within the field of view of the respective passengers inside the vehicle 12. In this example, the offboard server 110 that an entity is within the field of view of the back seat passenger (e.g., through the right or left side window(s) of the vehicle 12), but not within the field of view of the front seat passengers.

As previously stated, at step 208, the offboard server 110 obtains the information pertaining to the entity/ies that are within proximity to the vehicle 12. However, for the instant example, the offboard server 110 will retrieve the selected content source(s) from, e.g., the file of the user profile corresponding with a person inside the vehicle 12 whose field of view contains an object representing the entity. This is done for each person inside the vehicle 12 having an entity falling within his/her field of view. Referring back to the example above, since the entity is within the field of view of the back seat passenger, and the file for this person is available in the user profile, the offboard server 110 will refer to the back seat passenger's selected content source to retrieve pertinent information of the entity. The information retrieved from the content source(s) is then transmitted to the telematics unit 14 of the vehicle 12 at step 210.

Upon receiving the information, the telematics unit 14 sends a command to an appropriate vehicle system to display the information, and the information is displayed at step 212 of FIG. 2. The telematics unit 14 (via the processor 36 running computer readable code) determines where the information should be displayed before sending the command to display the information. For example, the information pertaining to the entity that is within the field of view of the back seat passenger may be displayed by producing an augmented overlay through the back window on the left hand side of the vehicle 12 (which may have a unique identifier) so that the overlay is produced next to or on the object representing the entity and is perceivable by the back seat passenger. In this example, the command(s) to display the information that is/are sent to the appropriate vehicle system(s) from the telematics unit 14 may include i) the unique identifier of the window of the vehicle through which the overlay will be produced (e.g., the back right or left window) and ii) the information to be displayed (e.g., information for the vehicle back seat passenger). The information may also be supplied as an audible message. In the example provided herein, the audible message may be played to the back seat passenger over all of the speakers 30, 30' or the right or left side, back speaker(s) 30, 30'.

When the augmented overlay is displayed to the passenger(s) alone, the passenger(s) may utilize a gesture to pass the overlay to the driver. The gesture may be, for example, a swipe of the passenger's hand in the direction of the driver, a finer pointing in the direction of the driver, etc. This gesture may be recognized by the sensor 132, which is programmed to recognize the gesture and translate the gesture into a command to move the overlay within the field of view of the driver. In some instances, the passenger(s) may be given the option to create a reduced-content version of the presented overlay that may be passed to the driver. For example, the passenger(s) may be able to reduce the amount of information that is provided to the driver by making multiple hand gestures that indicate which information should be passed to the driver.

An augmented overlay may also be displayed to the passenger(s) alone, for example, if the driver's profile specifies that while he/she is driving, passenger overlays alone are to be presented (i.e., no overlays are to be presented to the driver). As mentioned above, the vehicle owner or driver may specify other restrictions as to when the overlays are to be presented. For example, the driver's profile may specify that overlays are not to be presented when his/her child(ren) are in the vehicle 12.

As illustrated herein, the methods may advantageously enable a user to obtain information about an entity or entities within his/her field of view while he/she is travelling. The method(s) deliver information in real time, thus enabling a vehicle occupant to be informed of his/her surroundings while on the move.

While several examples have been described in detail, it will be apparent to those skilled in the art that the disclosed examples may be modified. Therefore, the foregoing description is to be considered non-limiting.

The invention claimed is:

1. A method of providing information to a vehicle, comprising:
    selecting content, and a source from which the information is retrievable, the information pertaining to the content and the content being associated with an entity, the source being a vehicle user address book and the entity being a person having a contact in the vehicle user address book;
    tracking the vehicle in real time, the tracking being accomplished via a telematics unit operatively disposed in the vehicle;
    via the telematics unit, uploading data obtained from the tracking to an offboard server, the data including at least a then-current location and a then-current speed of the vehicle;
    via a processor associated with the offboard server, utilizing the data to identify the person that is within proximity of the vehicle;
    via the offboard server, obtaining the information from the vehicle user address book, the information being associated with the person that is within proximity of the vehicle;
    transmitting the information from the offboard server to the telematics unit; and
    displaying the information to the vehicle so that the information is associated with an other vehicle representing the person, the other vehicle being within a field of view of a vehicle occupant, and the displaying including presenting any of text or graphics as an augmented overlay on or adjacent to the other vehicle.

2. The method as defined in claim 1 wherein the selecting of the content and the content source is accomplished utilizing one of a remotely accessible page, an aggregator at a call center, or an application resident on a mobile communications device.

3. The method as defined in claim 2 wherein during the selecting of the content and the content source, the method further comprises selecting at least one preference for the information to be transmitted from the offboard server to the telematics unit.

4. The method as defined in claim 1, further comprising:
    constructing a geographic boundary around the vehicle using the data obtained from the tracking;
    detecting that the vehicle is within proximity of the person when the person is inside the geographic boundary constructed around the vehicle; and displaying the information pertaining to the person upon making the detection.

5. The method as defined in claim 1 wherein prior to the displaying of the information, the method further comprises:
   detecting a then-current environment within which the vehicle is travelling; and
   based on the detecting of the then-current environment, via a processor operatively associated with the telematics unit, restricting the information that is displayed by a graphic user interface, the restricting including a limit on any of a presentation, an amount, or a type of the information displayed.

6. The method as defined in claim 1 wherein prior to displaying the information, the method further comprises determining a modality for the displaying of the information, the modality being chosen from a visual modality and a haptic modality.

7. The method as defined in claim 6 wherein the displaying is accomplished using a digital projector.

8. The method as defined in claim 7 wherein the displaying of the information further includes displaying at least one actionable item associated with the information, wherein the at least one actionable item is selectable by a vehicle user using a physical motion that is recognizable by an in-vehicle sensor.

9. The method as defined in claim 8 wherein upon displaying the information and the at least one actionable item, the method further comprises selecting the at least one actionable item via the physical motion.

10. The method as defined in claim 8 wherein the at least one actionable item includes any of:
   an option to send a text message to the person represented by the other vehicle;
   an option to initiate a phone call to the person represented by the other vehicle;
   a yes icon for responding to a question;
   a no icon for responding to a question;
   a selectable icon; or
   a moveable icon.

11. The method as defined in claim 1 wherein upon displaying the information, the method further comprises:
   recognizing, via a camera located in the vehicle or a capacitive sensor having a sensing range and located in the vehicle, a physical motion that is indicative of a command to capture information of interest;
   in response to the recognizing, capturing the information of interest; and
   storing the captured information of interest in a profile.

12. The method as defined in claim 1 wherein prior to displaying the information to the vehicle, the method further comprises restricting the information so that the restricted information is viewable by the vehicle occupant.

13. The method as defined in claim 12 wherein the restricting of the information is based on an increased driver activity.

14. The method as defined in claim 1, further comprising adjusting the augmented overlay based on eye positioning of the vehicle occupant and a concavity of a windshield of the vehicle.

15. A system for providing information to a vehicle, comprising:
   a remotely accessible page, an aggregator at a call center, or an application resident on a mobile communications device for selecting content that is associated with a person having a contact in a vehicle user address book, and for selecting a source from which the information is retrievable, the source being the vehicle user address book;
   a telematics unit operatively disposed in the vehicle, the telematics unit to track the vehicle in real time;
   an offboard server in selective communication with the telematics unit, the offboard server to receive data obtained from the telematics unit during the tracking, wherein the data includes at least a then-current location of the vehicle;
   a processor operatively associated with the offboard server, the processor to run computer readable code encoded on a computer readable medium for utilizing the data obtained from the telematics unit to identify the person that is within proximity of the vehicle;
   the vehicle user address book from which the information is retrievable by the offboard server; and
   a graphic user interface operatively disposed in the vehicle for displaying, to an occupant of the vehicle, the information retrieved by the offboard server, the information being associated with an other vehicle representing the person that is within proximity of the vehicle and within a field of view of the vehicle occupant, and the information being presented as an augmented overlay on or adjacent to the other vehicle.

* * * * *